United States Patent [19]

Molivadas

[11] 4,211,207
[45] Jul. 8, 1980

[54] HEATING AND COOLING SYSTEMS

[76] Inventor: Stephen Molivadas, 2800 Upton St., NW., Washington, D.C. 20008

[21] Appl. No.: 457,271

[22] Filed: Apr. 2, 1974

[51] Int. Cl.² .............................................. F24J 3/02
[52] U.S. Cl. .................... 126/433; 165/105; 165/40; 237/2 B; 126/437
[58] Field of Search ................... 62/160, 119, 62; 237/1 A, 2 B, 9, 67; 165/105; 126/270, 271

[56] References Cited

U.S. PATENT DOCUMENTS

| | | | |
|---|---|---|---|
| 1,119,063 | 12/1914 | Burnap | 126/271 |
| 1,801,710 | 4/1931 | Abbot | 126/271 |
| 2,140,079 | 12/1938 | Jennings | 237/9 |
| 2,363,118 | 11/1944 | Chamberlain | 165/105 |
| 2,434,086 | 1/1948 | Traylor, Jr. | 237/9 |
| 2,575,478 | 11/1951 | Wilson | 237/1 A |
| 2,689,090 | 9/1954 | Wetherbee et al. | 237/1 A |
| 2,693,939 | 11/1954 | Marchant et al. | 165/18 |
| 3,178,113 | 4/1965 | Curry et al. | 126/270 |
| 3,224,214 | 12/1965 | Nickell et al. | 62/217 |
| 3,257,806 | 6/1966 | Stahl | 60/655 |
| 3,260,064 | 7/1966 | Newton | 62/217 |
| 3,390,672 | 7/1968 | Snelling | 126/271 |
| 3,803,865 | 4/1974 | Newton | 62/217 |
| 3,899,897 | 8/1975 | Boerger et al. | 62/217 |
| 3,952,519 | 4/1976 | Watson | 60/659 X |

FOREIGN PATENT DOCUMENTS 1204119   9/1970   United Kingdom .................. 60/655

*Primary Examiner*—Albert W. Davis, Jr.
*Attorney, Agent, or Firm*—Fleit & Jacobson

[57] ABSTRACT

A combined heating and cooling system includes a solar collector and evaporator for absorbing heat from solar radiation and/or the ambient air and for using the absorbed heat to evaporate a binary-phase, liquid-vapor working fluid. In the heating mode, whenever the temperature of the working fluid inside the evaporator of the solar collector is sufficiently higher than that of the medium to be heated, the working fluid follows a cycle similar to the Rankine cycle in which the heat engine is eliminated. Whenever the temperature of the working fluid inside the evaporator is no longer high enough for heat to be transferred unassisted to the medium to be heated, the working fluid is made to follow a heat-pump cycle. Finally, whenever the temperature of the working fluid in the evaporator falls below the temperature of the surrounding air, the evaporator is exposed to the ambient air and the system runs as an air-source heat pump. In the cooling mode, the system is run as a vapor-compression refrigeration cycle in which the compressor is selectively powered by the use of a solar-assisted Rankine power cycle. Means are also disclosed for cycle selection and control utilizing the equilibrium radiation temperature of the solar collector and evaporator.

50 Claims, 22 Drawing Figures

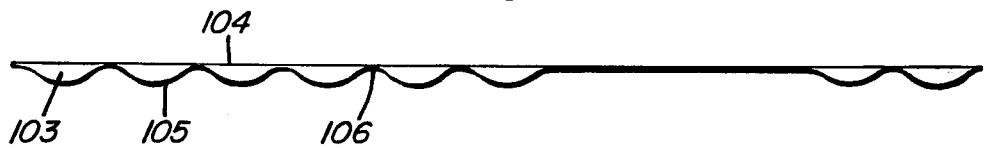
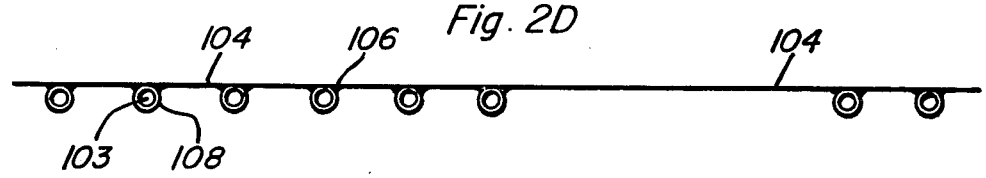
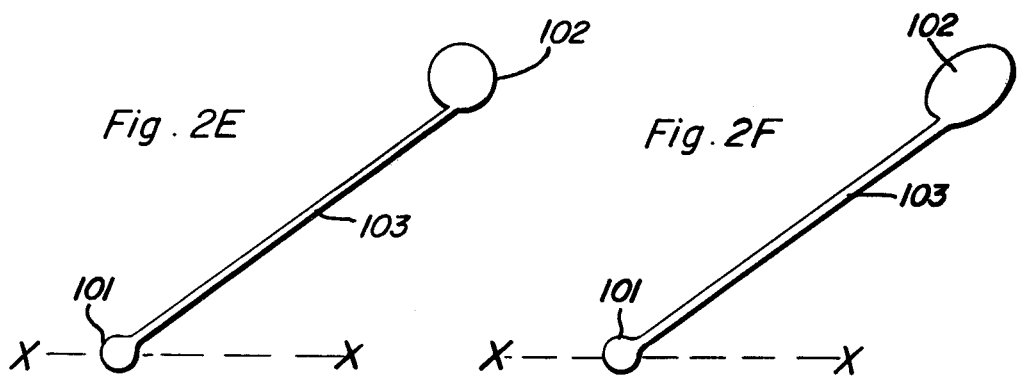
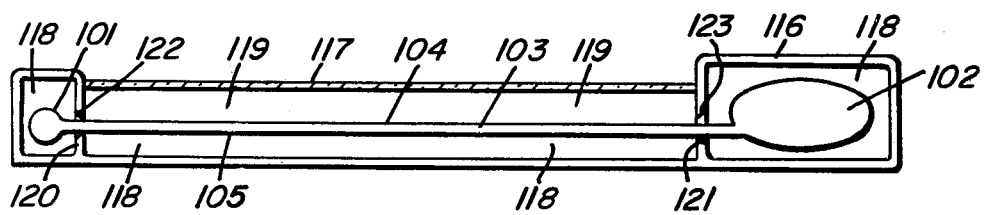
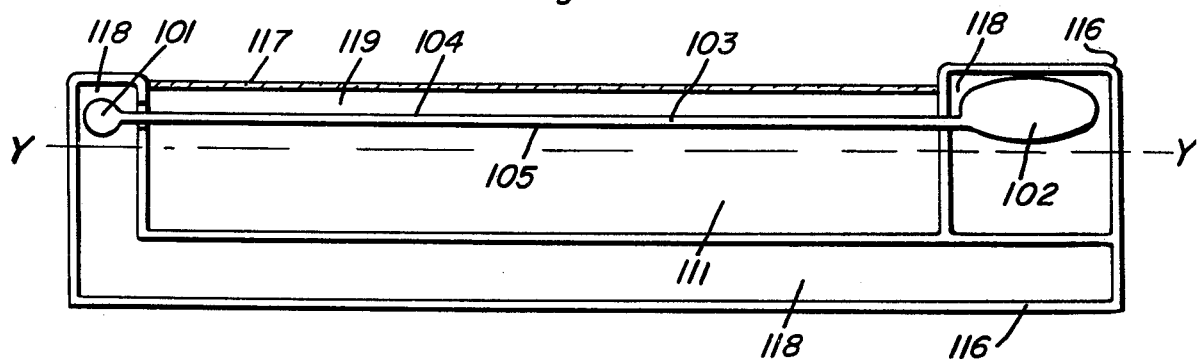

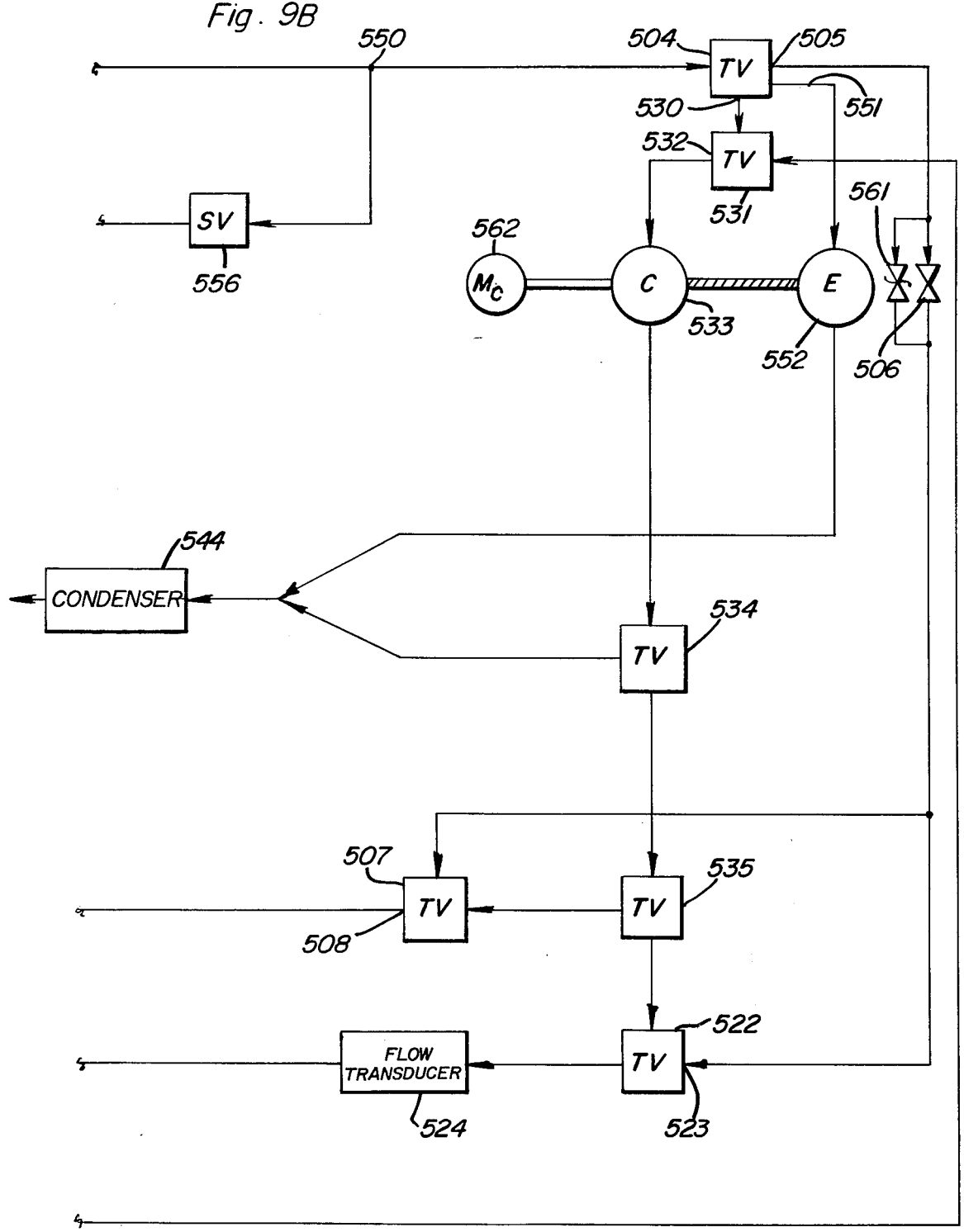

HEATING AND COOLING SYSTEMS

FIELD OF THE INVENTION

The present invention relates to a combined heating and cooling system to be used primarily for buildings and the like in which a primary source for the energy requirements of the system is the sun's radiation.

The present invention is the outcome of a systematic effort to minimize, for a given performance, the cost of heating and cooling systems utilizing the sun's thermal energy, supplemented by that of the earth's atmosphere.

DESCRIPTION OF THE PRIOR ART

While there have been prior attempts to utilize the sun's radiation to heat and cool buildings by employing the absorbing surface of solar collectors, the prior attempts have been ineffective and inefficient. This is particularly true in the case of planar solar collectors which are of particular importance because they are most readily capable of mass production and therefore less expensive to produce.

The cost effectiveness of planar solar collectors as a power source to heat and cool buildings and the like is dependent on a large number of diverse factors. However, prior efforts have failed to address themselves to five very important factors which substantially increase the effectiveness of planar solar collectors for this purpose. These factors are:

(1) maintaining the absorbing surfaces of the collector at a uniform temperature;

(2) utilizing the same working fluid to remove thermal energy from the solar collector and to release it to the medium to be heated when the temperature of the collector's absorbing surface is both above and below the temperature of the medium to be heated;

(3) utilizing the energy absorbed by the solar collector and the same working fluid for both heating and cooling;

(4) reducing the mass flow rate of the working fluid per unit of heat absorbed in, and removed from, the collector; and (5) utilizing a collector module configuration which is suitable for both large and small scale installations.

Furthermore, prior art systems fail to utilize essentially the same equipment to extract heat from the earth's atmosphere to supplement the heat obtained from the sun's radiation.

A more detailed discussion of prior attempts to utilize solar energy in heating and/or cooling systems appears hereinafter in connection with the detailed description of the various features of the present invention.

SUMMARY OF THE INVENTION

The present invention relates to improved systems and methods for heating primarily buildings and their hot water supplies, and for cooling buildings, by utilizing free sources of thermal energy. The invention contemplates utilization of the solar energy intercepted by a planar solar collector which may be supplemented by the thermal energy of the atmosphere. The latter energy is, in one configuration, absorbed by the fluid flowing in the same evaporator as the one used (in the collector) to absorb solar heat.

The working fluid used throughout the system belongs to the class of volatile fluids referred to as refrigerants.

For heating applications, the same refrigerant is used throughout the system and thus heat exchangers between two different working fluids, such as water and a refrigerant or two different refrigerants, are always eliminated. In applications including cooling, two different refrigerants may be used in some cases, depending on the design parameters of a particular installation. The preferred embodiment described in the present disclosure outlines the preferred embodiments for the case when the same refrigerant is used throughout.

The complete system of the present invention uses five different thermodynamic cycles: three alternative cycles for heating; and one cycle alone, or two different cycles simultaneously, for cooling. The five cycles can be referred to generically as follows:

(i) a Rankine-type transfer cycle
(ii) a solar-assisted, vapor-compression heating cycle,
(iii) an (atmospheric) air-assisted, vapor-compression, heating cycle,
(iv) a Rankine power cycle, and
(v) a vapor-compression cooling cycle.

The names used to describe cycles (i) through (v) have been chosen solely so that they can contribute to the clarity of the description of the present invention. Cycles (i) through (iii) are used for heating, cycle (v) alone for cooling, and cycles (iv) and (v) simultaneously for cooling.

The Rankine-type heat transfer cycle is used when the saturated-vapor temperature of the refrigerant in the solar collector is significantly higher than the temperature of the medium to be heated. The cycle has been so named because it resembles a Rankine power cycle without superheat in which the engine has been omitted. More specifically, the working fluid absorbs heat in the solar collector primarily by evaporation, releases it to the medium to be heated primarily by condensation, and is returned, in its condensed form, to the solar collector by a pump.

The solar-assisted, vapor-compression heating cycle is used when the saturated vapor temperature of the refrigerant in the solar collector is below the temperature of the medium to be heated, or not sufficiently above it for the Rankine-type heat transfer cycle to be used and provide heat at the desired rate. This cycle is similar to a conventional vapor-compression, heat pump cycle, but is controlled by novel techniques.

The air-assisted vapor-compression heating cycle is a conventional vapor-compression, heat pump cycle, but is controlled differently.

The Rankine power cycle is a conventional Rankine power cycle with negligible superheat. It is used by a thermal engine powered by the solar heat absorbed by the refrigerant in the collector. This engine is employed exclusively, or with the assistance of an electric motor, to drive the compressor(s) of the vapor-compression cooling cycle.

Finally, the vapor-compression cooling cycle is a conventional vapor-compression, refrigeration cycle, but is controlled differently in all cases where the medium to be cooled is the storage medium of a latent-heat reservoir.

The present disclosure further relates to novel systems in which apparatus used to instrument the five cycles listed earlier are combined in a number of different ways.

A typical configuration of a combination for heating two different media, and cooling one medium, inside a building is described under the heading "An Embodiment of the Invention, Overall System."

The solar collector and evaporator employed may use any type of tracking focused or planar collector, or any type of fixed planar collector. However, the foregoing novel methods for heating and cooling were devised primarily for solar collectors consisting of fixed planar modules whose surfaces have no more than two or three orientations. In this case, the preferred type of evaporator used is functionally similar to the type of evaporator described in the art as a flooded evaporator. However, its physical configuration is novel. Further details of the present invention are described and discussed in the context of a solar collector and evaporator consisting of planar modules lying in a single plane and using a flooded evaporator.

With the foregoing in mind, it is a primary object of the present invention to provide a new heating and cooling system which can extract and utilize the heat primarily from the sun's radiation, and secondarily from the surrounding air.

A further principal object of the present invention is to provide a new heating system which can extract heat from the sun's radiation and transfer it to the medium to be heated by using the same working fluid and the same means for distributing this fluid in the solar collector both in the case when the temperature of this fluid inside the collector is higher and lower than the medium to be heated.

Still another important object of this invention is to use the same working fluid and the same means of distributing this working fluid inside the collector to extract heat from the sun's radiation to power a heat engine used to drive the compressor(s) of a vapor-compression cooling cycle.

Yet another object of the present invention is to supplement solar heat with atmospheric heat at the cost of only an insignificant amount of additional equipment.

A still further object of the present invention is to provide a novel planar collector configuration whose absorbing surface is maintained at a uniform temperature, employs a working fluid which can absorb a given amount of heat while it is in the collector, and release it to the medium to be heating, with the lowest possible mass flow rate.

Still further primary objects of the present invention reside in the reduced operating costs involved in heating and cooling in accordance with the systems embodied in this invention.

These and other objects of the present invention will become apparent from the following description, specification, claims and accompanying drawings.

DESCRIPTION OF THE DRAWINGS

FIGS. 2b, 2c, and 2d are sections along lines 2b—2b, 2c—2c, and 2d-2d of FIG. 2a and show three typical configurations of the evaporator passageways;

FIGS. 2e and 2f are side elevations of the novel evaporator along section lines 2e—2e and 2f—2f of FIG. 2a showing two different vapor header shapes;

FIGS. 3a and 3b are side illustrations of two forms of solar collectors containing the novel evaporator of FIG. 2a in which only solar energy is collected in the FIG. 3a form and both solar and thermal energy are collected in the FIG. 3b form;

FIGS. 9a and 9b are a composite schematic flow diagram of the heating and cooling system of the present invention showing a typical application for a building.

DESCRIPTION OF PREFERRED EMBODIMENTS FOR TYPICAL APPLICATION

PRELIMINARY REMARKS

The preferred embodiments described hereinafter relate to a typical application of the invention. It will be readily appreciated by those skilled in the art that the heating and cooling system of the present invention has numerous applications, such as office buildings, hospitals, residential dwellings, industrial process heating operations, and any other application requiring heating or cooling within the temperature range of the equipment and working fluid used.

THE SOLAR COLLECTOR AND EVAPORATOR

In general, any solar collector configuration and, in particular, any of the conventional planar solar collector configurations used heretofore can be used in the instant invention. However, the advantages offered by the present invention including the novel controls described hereinafter are exploited to a much greater extent by using, in the case of planar solar collectors, the novel working fluid distribution configuration illustrated in FIG. 2a.

Figure 1:
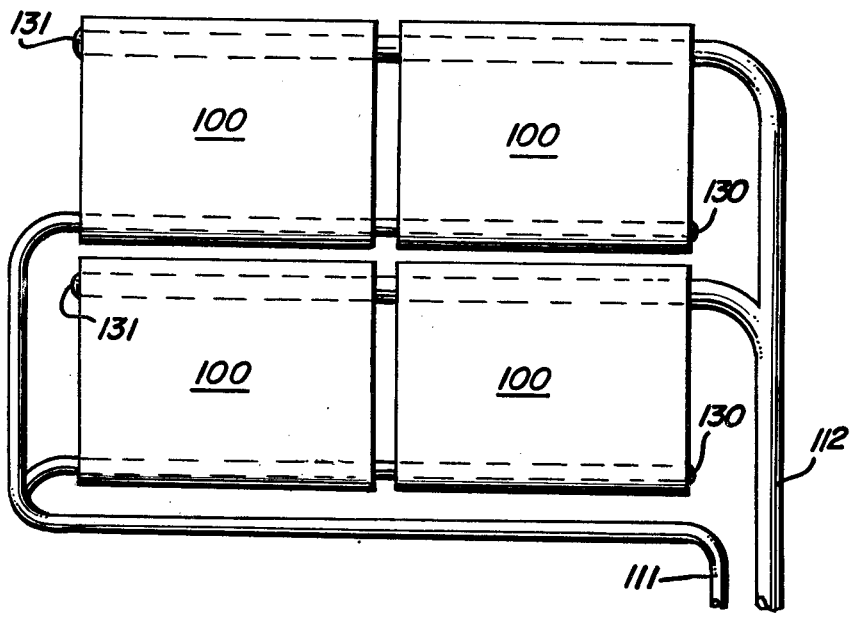
FIG. 1 is a schematic illustration showing a typical assembly of four solar collector module panels of the present invention.

A partial assembly of a typical solar collector configuration containing only four modules is shown in FIG. 1. It will be appreciated that many modules are normally required for even the smallest solar collector and the number obviously depends on the size of the collector desired. The modules can conveniently be assembled at the building site.

The evaporator 100A of each solar collector module 100 consists of a liquid distribution header 101, a vapor collection header 102, and a set of passageways 103 connecting the liquid header to its vapor header. The function of this set of passageways is to bring the liquid refrigerant to intimate thermal contact with its sheet metal panel 104. The sheet metal panel 104, which extends over the entire surface of the solar collector module between the two headers 101 and 102 may be an integral part of the set of passageways 103, or may be a separate sheet of absorbing material in intimate thermal contact with the set of passageways, and joined to them by a process such as brazing or welding.

Figure 2A:
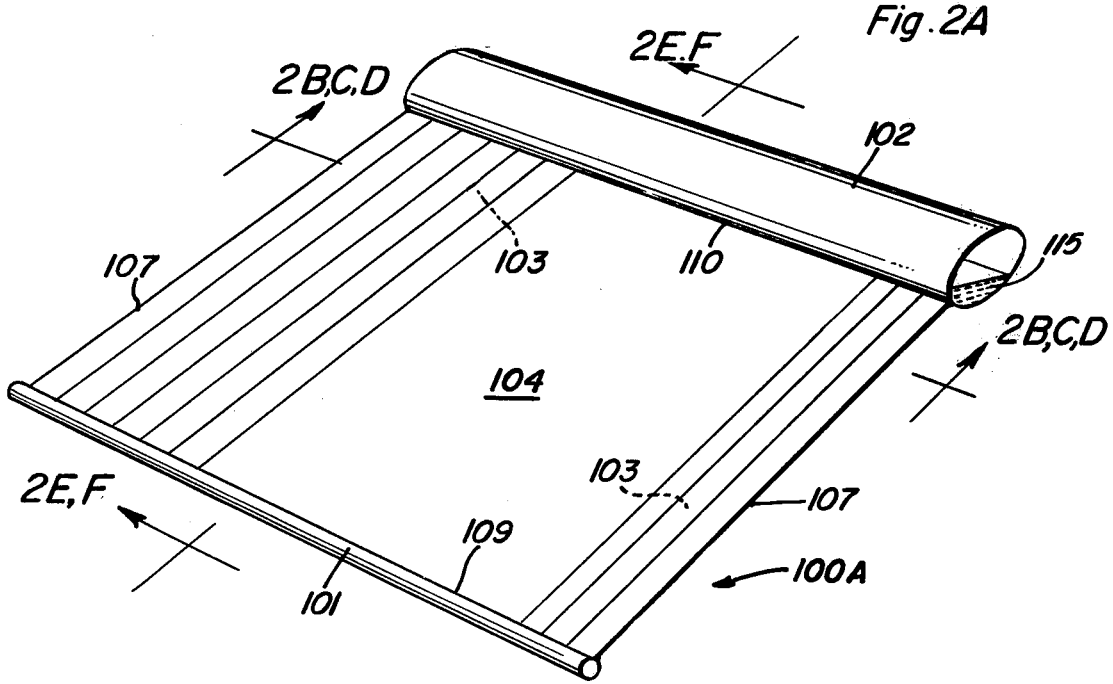
FIG. 2a is a perspective view of the evaporator in which the working fluid is evaporated in the solar collector in accordance with the present invention.
Figure 2B:
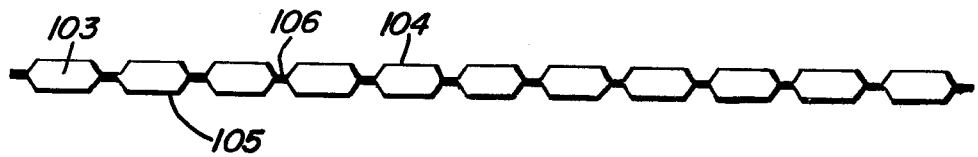

In the former case, the heat absorbing (metal) panel 104 itself may either consist of raised and depressed areas joined to another metal panel 105 with matching raised and depressed areas in such a way as to form channels, joining its liquid and vapor headers, through which the liquid refrigerants could flow, or it may be flat and joined to another sheet which has raised and depressed areas (see FIG. 2).

Such channels 103 could be typically joined by two fluted panels, joined together by seams 106 (which may be brazed, bonded or welded seams), whose flutes may have axes perpendicular to the axes of the two header. It is important to note, from the viewpoint of cost, that these seams need not be leak proof. In fact, from a functional standpoint, the two sheet metal panels could be two parallel plane sheets spaced, say, one eighth to one quarter of an inch apart. These two parallel panels are joined together only by leakproof seams 107 along its two panel edges perpendicular to the headers. The purpose of the intermediate seams is solely to increase the structural strength of the evaporator to allow a pressurized fluid at a pressure of up to, say, 250 to 300 lb/in$^2$ to be contained between two thin metal sheets, say, one eighth of an inch thick or less.

In the case where the sheet of absorbing material is not an integral part of passageway 103, the passageways may be a set of approximately parallel tubes 108 (See FIG. 2d) joined to the panel 104.

The absorbing panel 104 is joined to the headers 101 and 102 by brazed or welded seams 109 and 110, and so is the second panel or the tubes, as applicable.

The liquid header distributes liquid refrigerant to the set of passageways. These headers are connected together and the liquid manifold 111 (FIG. 2a) as shown in FIG. 1. The vapor header collects the refrigerant vapor that has been formed in the passageways of the evaporator by solar heat and passes it to vapor manifold 112. The vapor headers are connected together and to the vapor manifold as shown in FIG. 1. The ends 130 and 131 of the liquid and vapor headers that are not connected to another header are capped.

The liquid and vapor headers have orifices located so as to communicate with the passageways.

The purpose of the passageways is to distribute liquid refrigerant over the heat absorbing panel 104 so that the liquid can be evaporated (boiled) efficiently by the solar radiation impinging on and absorbed by panel 104, and the resulting vapor bubbles can escape to the vapor header.

Depending on the layout of a particular installation, it may be desirable to provide additional oil return paths to that provided by the manifold by tapping small tubes (not shown) into the line formed by the serially connected liquid headers at appropriate intervals. The slope of panel 104 must be such that the equilibrium level 115 of the liquid in the vapor header is high enough to keep the passageways 103 filled with liquid to ensure efficient evaporation, but not so high as to restrict significantly the flow of vapor in vapor header 102. Also the passageways 103 must be connected near the "bottom" of the vapor header 102 as shown in FIGS. 2e and 2f, where x—x is a horizontal reference line. The vapor header need not have a circular cross-section and elliptical shapes such as shown in FIG. 2f are also acceptable.

There are a large number of different ways the evaporator 100A shown in FIG. 2a could be incorporated into a complete solar collector module. No novel attachments or configuration are claimed for the overall module. However, for illustration, two typical configurations of an overall module are shown in FIGS. 3a and 3b.

In the FIG. 3a configuration, the refrigerant in the evaporator is used to absorb only solar radiation. The evaporator consists of liquid header 101, vapor header 102, absorbing panel 104, lower panel 105 which, together with panel 104, forms the passageways 103. The evaporator is contained within the external structure 116 and cover plate 117, which is transparent to solar radiation frequencies contained in the frequency spectrum corresponding to the temperature of the absorbing panel 104.

The space between the evaporator 100A and the structure 116 is filled with insulation 118. The space between the cover plate and the evaporator is airtight. Liquid and non-permeable insulation material is provided at 120, 121, 122 and 123, where the structure 116 comes in contact with the evaporator panels 104 and 105.

In the FIG. 3b design, the evaporator 100A is also used to absorb heat from the air surrounding the collector module. The space 119 is airtight when solar heat is used as the source of free energy, and open to the surrounding air when the thermal energy of the atmosphere is used as the source of free energy. Suitable dampers are provided at each end of a row of modules for this purpose. In most cases, the collector module itself would consist only of the portion shown in FIG. 3b above the line y—y. The channel 111 below the y—y line being formed by the supporting structure such as the roof, wall, etc. on which the collector module is mounted.

The preferred material for the evaporator 100A is aluminum. The absorbing panel 104 should be coated by a frequency-selective material.

A typical coating is copper oxide, which is deposited on panel 104 after its surface has been polished. Frequency-selective coatings that can be formed by an electro-plating process are also acceptable and inexpensive.

Since the maximum efficiency of the solar collector modules requires that the temperature of the liquid refrigerant entering the collector differ by only a few degrees from the temperature of the saturated vapor in the vapor header, the Rankine-type heat transfer cycle will be discussed next and the solar-assisted, vapor-compression cycle and the Rankine power cycle discussed later are controlled in such a manner that this condition is satisfied.

Some of the advantages resulting from the novel evaporator configurations and operation described heretofore are as follows:

(1) all of the solar collector heat absorbing panels are maintained at approximately the same uniform temperature say within 1°–2° F.;

(2) the speed of the liquid refrigerant in the passageways is low, typically one or two feet per minute, and is independent of the number of modules connected in a row; thus friction is negligible, (b 3) the optimal sizes of the passageways is unaffected by the number of modules connected in series and hence also by the overall size of the solar collector. Thus, only the optimal size of the headers is affected by the number of modules connected in series, and oversizing only these headers, as opposed to oversizing all the passageways (tubing), for small installation so that they can also be employed for large installation entails only a small penalty in cost. Hence, for example, a single solar module design could be used for solar collection from, say, 600 to 12,000 square feet, and perhaps only one additional design for sizes between 8,000 and 160,000 square feet.

THE RADIATION EQUILIBRIUM TEMPERATURE

In the present invention, the term "radiation equilibrium temperature" of the heat absorbing panel 104 refers to that radiation equilibrium temperature attained by the panel when no heat is removed by the refrigerant. This differs markedly from earlier efforts, Marchant et al in U.S. Pat. No. 2,693,939. Where the patentees measure the radiation equilibrium temperature of the airspace between the collector transparent cover plate (5) and the energy absorbing panel.

In the present invention the "radiation equilibrium temperature" is measured continuously even when the working fluid (refrigerant) is removing heat from the solar collector. This is accomplished for example by using a temperature transducer where thermal bulb is in intimate contact with the heat absorbing panel of a small dummy collector module which uses exactly the same cover plate, panel spacing and panel material (including any frequency-selective coating), as the operating solar collector modules. However, the dummy collector contains no liquid and vapor header, and no refrigerant. The heat absorbing plate is however insulated from the surrounding air and supporting structure in a manner which replicates the rate at which the heat absorbing panel of a regular collector module loses heat to its surroundings when no heat is being removed from it by its working fluid. The dimensions of the dummy collector module must be large enough for so-called "end effects" to be negligible. A typical panel size is six inches by one foot. The thermal bulb of the temperature transducer is placed in the center of the panel, and the panel orientation must be the same as that of the solar collector itself. If the collector consists of two or three planes with different orientations, a different dummy collector module must be provided, and the radiation equilibrium temperature must be measured, for each such plane.

RANKINE-TYPE HEAT TRANSFER CYCLE

Known systems, developed or proposed, that use the sun's thermal energy to heat buildings employ a liquid or a gas to transfer heat from the solar collector to a medium in the building. This medium may be the air of a forced-air heating system, the water of a hot-water heating system, the storage medium of a heat reservoir, or the refrigerant of a heat pump. A gas, usually air, is employed only for small buildings. In most cases, a liquid is employed which normally consists of a mixture of water and an "anti-freeze" liquid such as ethylene glycol. In all these cases, the temperature of the fluid leaving the solar collector is higher than that of the medium to be heated.

The present invention contemplates instead that heat be transferred from the solar collector by a volatile fluid whose phase alternates between the liquid and vapor states so as to absorb latent heat while it is being evaporated by the sun's radiation and so as to release latent heat while it is being condensed by the heat receiving (cooler) medium. Volatile fluids used to transfer heat in this manner are called refrigerants. Such fluids are usually employed to transfer heat from a body at a given temperature to a body at a higher temperature, and not to a body at a lower temperature as proposed in the present invention.

I now discuss the foregoing binary-phase heat transfer cycle in greater detail.

Figure 4:
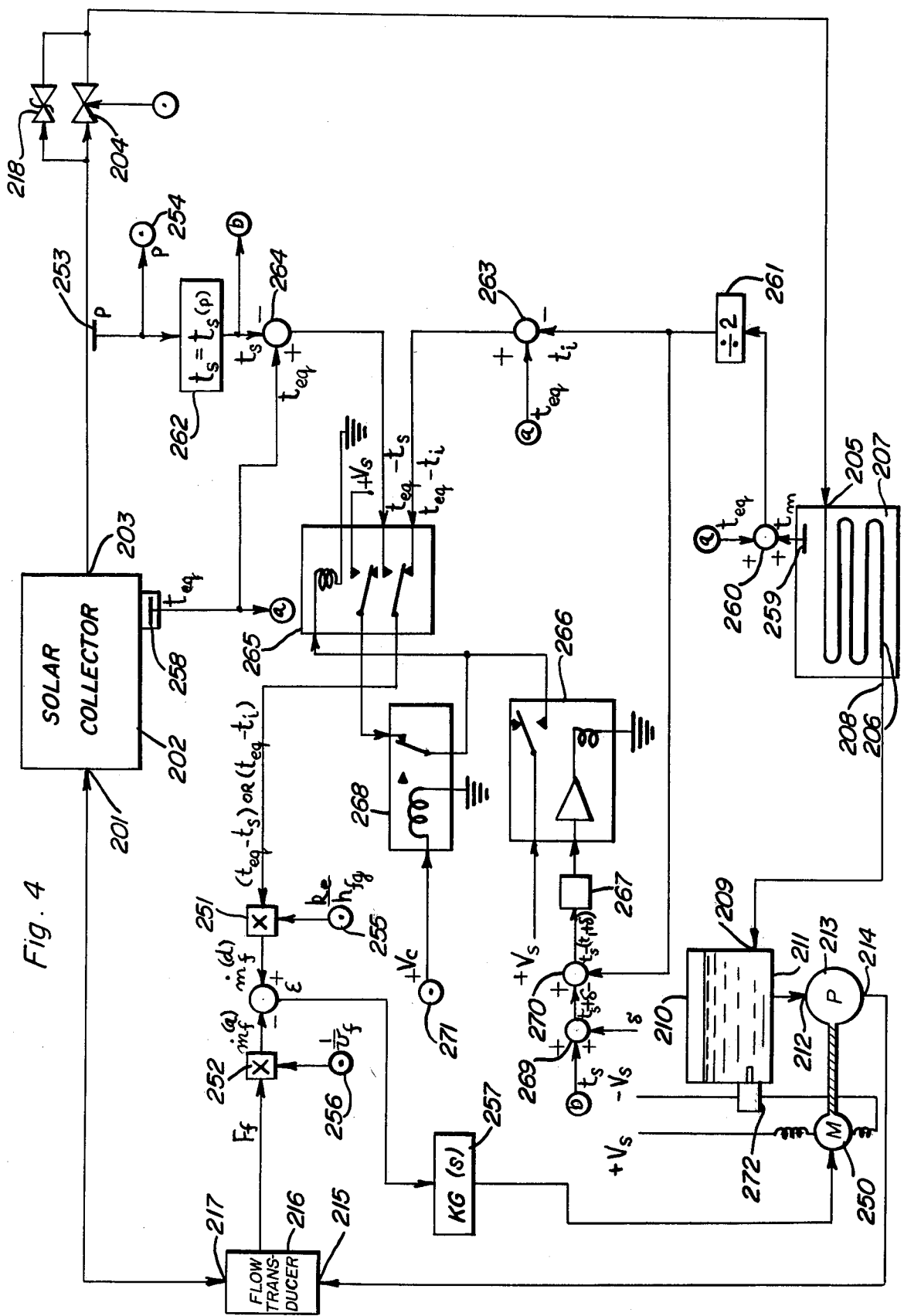
FIG. 4 is a schematic flow diagram of the Rankine-type heat transfer cycle of the present invention.

In this cycle, referring to FIG. 4, the refrigerant, in its liquid phase, enters solar collector (and evaporator) 202 at point 201, absorbs heat in this collector, primarily while it is being evaporated (by the sun's heat), and exits the solar collector at point 203 after the liquid refrigerant has been transformed into vapor. The refrigerant passes through the servo-controlled throttling valve 204, and then enters at point 205 condensing coil 206 where it is condensed by releasing heat, to the medium 207 by conduction, free or forced convection, or radiation. The condensing coil may be bare or finned, and can have any known configuration compatible with the medium. The refrigerant exits this condensing coil at point 208 after the vapor has been condensed. From point 208, the refrigerant enters at point 209 the receiver (liquid reservoir) 210 and, after exiting at point 211, enters at point 212 the (liquid) feed pump 213. After the refrigerant is compressed, it exits this pump at point 214, enters at point 215 flow transducer 216 and, after exiting from the flow transducer at point 217, is returned to point 201. Safety valve 218 opens only if the refrigerant pressure at exit 203 exceeds the maximum design pressure.

The salient features of the cycle traversed by the refrigerant may be summarized by saying that it resembles a Rankine power cycle in which the engine has been omitted. This is the reason why this cycle was referred to earlier as the Rankin-type heat transfer cycle.

Solar collector (and evaporator) 202 can be any collector (and evaporator) whose heat absorbing panel remains at a temperature below the critical temperature of the refrigerant used. However, the details of the control techniques described hereinafter are tailored to solar collectors which possess the following properties:

(1) all collector (and evaporator) modules are planar and their cover plates lie in one or parallel planes;

(2) the heat-absorbing panels of these modules lose heat to their surroundings at a rate which depends essentially for a given radiation equilibrium temperature $t_w$ of the heat-absorbing panels and the temperature $t_a$ of the ambient air; and (3) the temperatures of the heat absorbing panels are all essentially equal and uniform over the entire surface of each plate. The first condition simplifies the discussion. The second condition holds for well designed planar collectors. The third condition can be fulfilled easily with the evaporator described under the heading "Solar Collector and Evaporator".

The rate $Q_{av}$ at which solar heat becomes "available" for absorption by the refrigerant in the solar collector reaches a maximum when the temperature $t_w$ of the absorbing plate is equal to the ambient air temperature $t_a$. In practice, this uniform temperature $t_w$ will differ insignificantly from the saturated-vapor temperature $t_s$ at which the refrigerant is being evaporated in the solar collector.

The rate $\dot{Q}_{av}$ reaches a maximum, for a given value of the equilibrium radiation temperature $t_{eq}$, when $t_s$ falls to the point where it becomes equal to $t_a$. This maximum value of $\dot{Q}_{av}$ is given by $$\dot{Q}_{av} = k_e(t_{eq} - t_a), \quad t_s \leq t_a \tag{1}$$

In this expression, $k_e$ is a factor which can be determined by calibration tests, and which remains approximately constant over a wide range of temperatures. The equilibrium radiation temperature $t_{eq}$ as defined previously, is the steady-state temperature of the solar-radiation absorbing panel when no heat is removed from this panel by the refrigerant.

The values of $\dot{Q}_{av}$ for values of $t_s$ greater than $t_a$, are given by $$\dot{Q}_{av} = K_e(t_{eq} - t_a) - k_e(t_s - t_a) = k_e(t_{eq} - t_s) \tag{2}$$

The rate $\dot{Q}_{abs}$ at which the refrigerant flowing through the solar collector can absorb heat while it is being evaporated is given by $$\dot{Q}_{abs} = h_{fg} \dot{m}_f \tag{3}$$

where $h_{fg}$ is the latent heat of evaporation of the refrigerant per unit mass and $\dot{m}_f$ is the refrigerant mass flow rate.

Except at start-up, servo-controlled throttling valve 204 is always set to the "full open" position. The thermodynamic cycle traversed by the state of the refrigerant when this throttling valve is open is shown on the pressure enthalpy diagram of FIG. 5.

Figure 5:
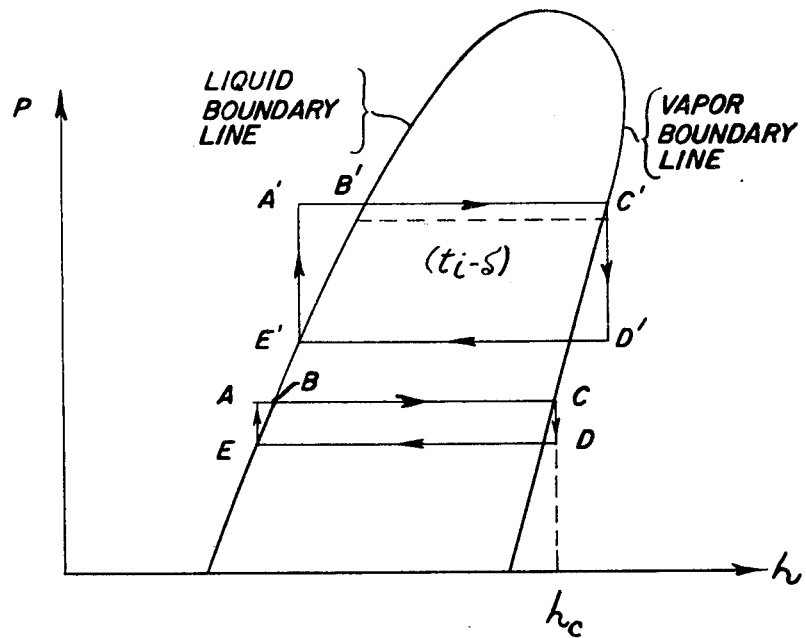
FIG. 5 is a typical pressure-enthalpy diagram for a refrigerant following the Rankine-type heat transfer cycle in accordance with the present invention.

When the refrigerant enters (at point 201) solar collector and evaporator 202 in FIG. 4, it is in state A in FIG. 5. Upon entering solar collector and evaporator 202, the refrigerant temperature is raised a couple of degrees Fahrenheit and the refrigerant's thermodynamic state crosses the liquid boundary line at B. At exit 203 in FIG. 4, the refrigerant is approximately in state C. Friction in the piping between exit 203 and entrance 205 to condensing coil 206 causes the temperature and pressure to drop slightly at constant enthalpy $h_c$ (see FIG. 5) so that the refrigerant reaches state D. The refrigerant leaves the condensing coil 206 and enters receiver (liquid reservoir) 210 in approximately state E from which it is raised in pressure, at approximately constant temperature, to state A by pump 213. In the case when the medium to be heated is a latent heat reservoir at temperature $t_m$, its temperature will typically be five to ten degrees Fahrenheit below the saturated-vapor temperature of the refrigerant in the condensing coil 207.

The electric motor 250, driving pump 213, controls the refrigerant mass flow rate $\dot{m}_f$ so that $$\dot{m}_f = \frac{k_e}{h_{fg}}(t_{eq} - t_s), \tag{4}$$

and hence ensures, to a high degree of approximation, that $$\dot{Q}_{abs} = \dot{Q}_{av}$$

and also that essentially all the heat absorbed by the refrigerant while it traverses solar collector and evaporator 202, is absorbed in the form of latent heat.

Servo-controlled throttling valve 204 assists in getting the refrigerant, after start up, to traverse a thermodynamic cycle from which it will automatically, after a transient, change over to the final regime whose steady state is represented by the cycle described earlier. To this end, a fixed-logic central control unit, which I shall refer to as the CCU, is used to select the appropriate initial partially open position of the servo-controlled throttling valve 204. When only the Rankine heat transfer cycle is used in a given system, the complexity of the CCU would not exceed that of an inexpensive, hand-held computer. The CCU also selects the initial temperature to be exceeded by the saturated-vapor temperature $t_s$ in solar collector and evaporator 202 before the throttling valve 204 is opened fully.

The electric motor 250, driving pump 213, after start-up and before the servo-controlled throttling valve 204 is fully open, controls the refrigerant mass flow rate $\dot{m}_f$ so that $$\dot{m}_f = \frac{k_e}{h_{fg}}(t_{eq} - t_i) \tag{5}$$

The CCU also selects the temperature $t_i$. A typical value for this temperature is $$t_i = \frac{t_{eq} + t_m}{2}. \tag{6}$$

When $t_s$ exceeds the value $(t_i - \delta)$, where $\delta$ is a small positive quantity, the said servo starts to control the electric motor 250 so as to approximate the mass flow rate given by the right-hand side of equation (4) instead of that of equation (5).

A typical thermodynamic cycle at the time just before this change over is illustrated by the polygon A'B'C'D'E' in FIG. 5.

A reliable change over to the final regime, and a shorter transient following it, are ensured (i) if the initial regime reaches a steady state condition before changing over to the final regime, and (ii) if the saturated-vapor temperature of the refrigerant in the condensing coil exceeds that of $t_m$. To this end, the change over to the final regime is delayed long enough, after $t_s$ has exceeded $(t_i - \delta)$, to ensure that the initial regime has reached a quasi steady-state condition, and the initial opening of the servo-controlled throttling valve 204 commanded by the CCU is, together with the chosen value of $t_i$, sufficient to ensure that the saturated-vapor temperature of the refrigerant in the condensing coil is higher than the temperature $t_m$ of the medium to be heated.

Referring to the servo-controlled electric motor 250, the desired value $\dot{m}_f^{(d)}$ of $\dot{m}_f$ after start up and before switchover is obtained by instrumenting equation (5) and, after switchover, by instrumenting equation (4) using multiplier 251. In either case the actual value $\dot{m}_f^{(a)}$ of $\dot{m}_f$ is obtained by using multiplier 252 to instrument equation $$\dot{m}_f^{(a)} = \frac{F_f}{v_f} \tag{7}$$

where $F_f$ is the refrigerant volumetric flow rate, as given by flow transducer 216, and $v_f$ is the specific volume of the refrigerant. The expression $k_e/h_{fg}$ and $1/v_f$ are only slowly varying functions of the refrigerant pressure p. The pressure p, as measured by pressure transducer 253, provides in general, a close enough approximation to the refrigerant's pressure at transducer entrance 215 as well as of the refrigerant pressure near exit 203, for computing the expressions $k_e/h_{fg}$ and $1/v_f$ supplied to multipliers 251 and 252, respectively. The pressure p is supplied to the CCU as indicated by symbol 254. The CCU computes the expressions $k_e/h_{fg}$ and $1/v_f$ as a function of p and supplies them to multipliers 251 and 252, respectively, as indicated by symbols 255 and 256. The servo controls the speed of motor 250 so as to tend to annul the servo error signal $$\epsilon = \dot{m}_f^{(d)} - \dot{m}_f^{(a)}.$$

To this end, the function KG, respresenting the transfer function of servo-amplifier and frequency-dependent network 257 must include an integrator. A typical expression of KG is given by $$KG(s) = K \frac{1 + \tau s}{s}, \qquad (8)$$

where K is the amplifier gain, $\tau$ a smoothing constant and the Laplace transform of the error signal $\epsilon(t)$ supplied to the servo amplified and frequency-dependent network 257.

The quantities $(t_{eq} - t_i)$ and $(t_{eq} - t_s)$, used as appropriate, in deriving the servo reference signal representing the quantity $\dot{m}_f^{(d)}$, are derived as follows. The solar collector radiation equilibrium temperature $t_{eq}$ is obtained by using temperature transducer 258 as explained in conjunction with the description of the solar collector. The temperature $t_m$ of the medium to be heated is obtained by using temperature transducer 259.

$$t_i = \frac{t_{eq} + t_m}{2} \qquad (6)$$

is instrumented by using adder 260 and divider 261. The saturated vapor temperature $t_s$ of the regrigerant corresponding to a given pressure is obtained from the pressure p (as measured by pressure transducer 253) by instrumenting the single-valued function $$t_s = t_s(p) \qquad (9)$$

by means of function generator 262. This function can be derived from published tables or graphs for any one of the commonly used refrigerants. The differences $(t_{eq} - t_i)$ and $t_{eq} - t_s$, respectively, by using adders 263 and 264, respectively.

The system employed to determine which of the foregoing two differences should be used consists of four devices: latching relay 265, changeover control relay 266, diode rectified 267, and latch-control relay 268. After start-up, and before changing over to using $(t_{eq} - t_s)$, the relay contracts are in the position shown in FIG. 4. When the signal representing the quantity $t_s - (t_i - \delta)$, which is formed by using adders 269 and 270, becomes positive, diode rectifier 267 allows this signal to pass causing changeover control relay to allow this signal to be supplied to latching relay 265. This causes the positive supply voltage $+V_s$ to be connected to the coil of latching relay 265, which, in turn, causes this relay to changeover to the latched position. In this position, latching relay 265 stops the signal representing the difference $(t_{eq} - t_s)$ from being fed to multiplier 251, and substitutes the signal representing the quantity $(t_{eq} - t_s)$. The purpose of the supply voltage supplied to latching relay 265 is to hold this relay in the latched position when the value of $t_s$ falls below $(t_i - \delta)$ after changeover and relay 266 returns to its initial position (which is the one shown in FIG. 4). This purpose is achieved as long as latch control relay 268 is in the position that provides a closed path between this supply voltage and earth through the coil of latching relay 265. This closed path exists when latch control relay 268 is in the position shown. When the Rankine-type heat transfer cycle is stopped or used to heat a medium at a higher temperature to the one being heated, the CCU provides as indicated by symbol 271, a control signal $+v_c$ which opens latch control relay 268 and causes latching relay 265 to return to its initial position.

The low-limit float switch 272 interrupts the power supply to motor 250 whenever the level of the liquid refrigerant is receiver 210 falls below a minimum preselected level. This prevents pump 213 from running dry.

If the solar collector consisted of modules lying in more than one plane, nearly all the components shown in FIG. 4 would have to be duplicated for each different plane.

In FIG. 4 none of the components which might be desirable for calibration or checking and servicing are shown. For example, most actual installations would include a temperature transducer to measure the working fluid temperature near exit 203. This temperature can be compared with $t_s$ to determine the existence of undesirable superheat. This temperature transducer can also be used to help estimate the quantity of the refrigerant vapor at exit 203 when the refrigerant leaving this exit is not superheated. It will be obvious to those skilled in the art how a small signal can be added to the signal controlling motor 250, and how the amount of this bias required to cause a detectable amount of superheat to appear at exit 203 can be used to estimate the quality of the refrigerant at this exit. Also, by allowing a measurable amount of superheat to exist at exit 207 during normal operations after steady state conditions have been reached in the final regime, the servo controlled-motor 250 can, during this regime, be driven by the error signal $$\epsilon = \Delta_{sp}^{(d)} t - \Delta_{sp}^{(a)} t, \qquad (9a)$$

where $\Delta_{sp}^{(d)} t$ and $\Delta_{sp} t^{(a)}$ are the preselected small amounts of superheat used as the reference signal and the measured amount of superheat, respectively. This method of controlling motor 250 would cause a small degradation in heat-transfer efficiency but would allow less accurate values of $\dot{m}^{(d)}$ and $\dot{m}^{(a)}$ to be used.

Finally, in inexpensive systems, and where a positive-displacement type pump is used for pump 213, the signal from a suitably calibrated tachometer, driven by motor 250 may be used to provide a measure of the volumetric flow rate $F_f$ instead of flow transducer 216.

If the centerlines of all the refrigerant piping are in the same horizontal plane, the cycle, once started, is self-sustaining in the absence of friction, and needs no pump. Under these ideal conditions the cycle also operates optimally without the help of a pump. As differences in elevation of the system components increase, or friction is increased by using smaller diameter piping, etc., the amount of heat transferred from the solar collector decreases. Further, if the elevation difference is excessive, the cycle is no longer self-sustaining. Although a feed pump can be used to offset the degradation in performance arising from differences in elevation and from friction, some residual degradation remains. Differences in elevation and the amount of friction should therefore be kept as small as possible.

In the absence of friction and differences in elevation $$t_s = \frac{1}{k_e + k_c} (k_e t_{eq} + k_c t_m). \tag{10}$$

Consequently, $t_s$ approaches $t_m$ as the rate $k_e/k_c$ tends to infinity. Since $$\dot{Q}_{av} = k_e(t_{eq} - t_s), \tag{2}$$

it also follows that, for a given heat transfer capacity $k_e$ of the solar collector, the rate at which heat can be transferred from the solar collector, for given values of $t_{eq}$ and $t_m$, increases with the heat transfer capacity $k_c$ of the condensing unit. This conclusion holds in the presence of differences in elevation and friction. However, the value of $\dot{Q}_{av}$ will in this case be smaller than the one given by equation (10).

SOLAR-ASSISTED, VAPOR-COMPRESSION HEATING CYCLE

The thermodynamic cycles commonly referred to as a vapor-compression, heat-pump cycle and as a vapor-compression refrigeration cycle both belong to the same class of thermodynamic cycles: they both use fluids whose state alternates once between the liquid and vapor phase during a cycle, they both compress the fluid once during a cycle when the fluid is in its vapor phase, and they are both employed to absorb heat from one medium and to release heat to another medium at a higher temperature. The foregoing two cycles, in essence, only differ in their purpose. Namely, the purpose of the heat pump cycle is to supply heat to the medium at the higher temperature, and the purpose of the refrigeration cycle is to remove heat from the medium at the lower temperature. To help clarify the subsequent description and discussion of the novel control methods of the present invention, I shall use the term vapor-compression heating cycle to refer to the former, the term vapor-compression cooling cycle to refer to the latter, and the term binary-phase vapor compression cycle to refer to both. I shall also refer to the equipment used to instrument the first cycle as a heat pump, and the equipment used to instrument the second cycle alone or both cycles as thermal pumps.

The conventional control systems of heat pumps are designed to match the heating load by cycling compressors on-and-off either simultaneously or sequentially in steps. In either case, the "start" and "stop" signals originate either in one or more thermostats in the conditioned space, or in devices which sense the temperature of the fluid used to heat the conditioned space.

In large custom-engineered systems, the capacity of individual compressors, if variable, is also varied in response to changes in the heating load detected indirectly by temperature measurements of the conditioned space or of the fluid used to heat that space. The saturated-vapor temperature (or corresponding pressure) of the working fluid in the evaporator is not controlled independently by such control systems. Instead this temperature takes on—with varying heating-load requirements—values consistent with these requirements and the temperature of the medium from which free thermal energy is extracted.

The foregoing indirect measures of heating load do not provide means for controlling optimally the state of the working fluid during the heating cycle under large changes in heating load, and this especially true in the case when these changes in load occur rapidly. Furthermore, these indirect measures cannot be employed when the medium to be heated is a latent heat reservoir. Nevertheless, the conventional control systems discussed hitherto—although not optimal—are, in most cases, acceptable where the maximum rate at which heat can be extracted from the free source of thermal energy is not the factor governing maximum system heating capacity, or when no large-capacity heat reservoir is used. Both of these conditions hold in most conventional vapor-compression heating systems. Namely, these systems emply no large-capacity heat reservoir, and the factor limiting maximum heating capacity is, in general, always compressor capacity.

Solar-assisted heat pumps must use large-capacity heat reservoirs to provide large reductions in non-free (purchased) energy and most such reservoirs store latent heat so as to save space. Furthermore, for such heat pumps, the factor governing maximum heating capacity is often the rate $\dot{Q}_{av}$ at which solar heat is available and can be removed from the solar collector, and is not compressor capacity. Under these conditions, a control system designed to attempt to match the heating load would nearly always be pursuing the wrong objective. However, even when this objective is the right one, a different control system from the one used hitherto in conventional heat pumps or solar assisted heat pumps is desirable. This is also true for heat pumps using atmospheric heat as the source of free energy whenever they employ a heat reservoir.

The novel control system for the vapor-compression heating cycle of this invention is based on a cycle using "optimal subcooling." The term "optimal subcooling" is used to refer to the case where the temperature of the refrigerant leaving a subcooler following the condenser is essentially the same as the temperature of the refrigerant entering the evaporator of the solar collector. Such subcooling is practicable if the temperature of the solar collector working fluid is, say, at least 20° F. above the temperature of the ambient air. A slightly modified control system applicable to cases when the foregoing condition does not hold is also contemplated and is discussed later. The novel control system for the vapor-compression cycle using optimal subcooling ensures automatically that the refrigerant vapor always leaves (the evaporator in) the solar collector dry, and enters it in the fully liquid state. The former condition is also satisfied by conventional control systems at the expense of accepting whatever evaporator pressure $p_e$ (and hence also saturated-vapor temperature $t_{es}$) is necessary to satisfy this condition. In the control system described here, the value of $p_e$ (and hence the corresponding value of $t_{es}$) can be chosed independently. This cannot be done with conventional control systems.

The desuperheating and condensation takes place in a separate unit from subcooling. I shall refer to the former as the condenser and the latter as the subcooler. The control system can adjust the heat released per pound of refrigerant by the condensing coil precisely by adjusting the condenser temperature differential The control system performs this adjustment by selecting precisely the condenser pressure $p_c$. The subcooler is a forced-air condenser whose coil is cooled by entering ventilation air. The subcooler capacity is adjusted to provide the precise degree of subcooling needed by varying the amount of ventilation air bypassing the coil.

Figure 6A:
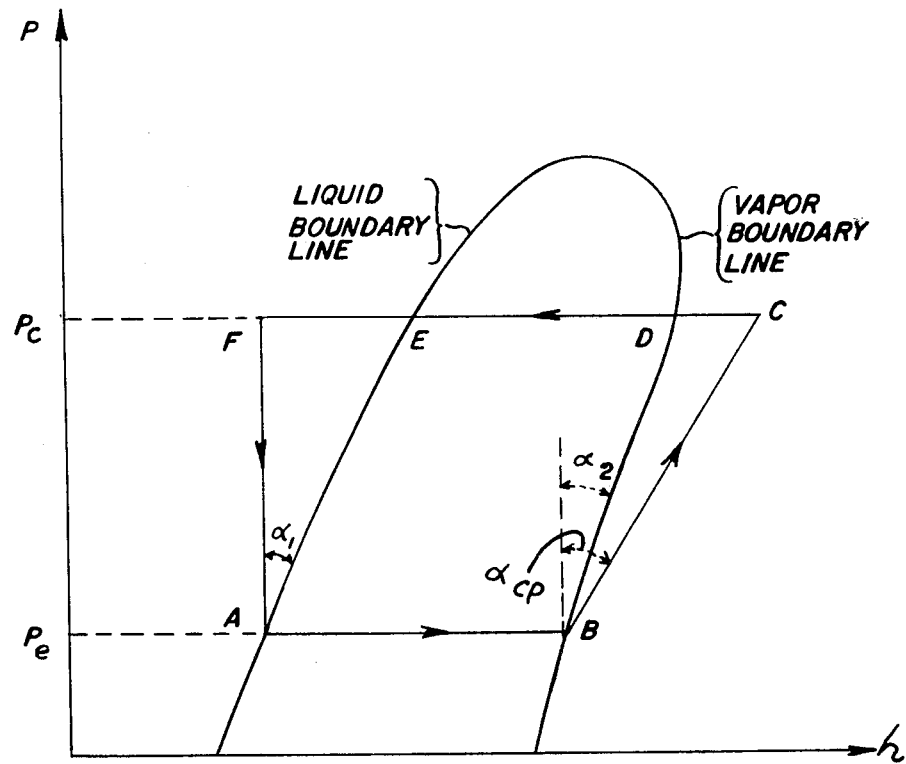
FIGS. 6a and 6b are typical pressure-enthalpy diagrams for a refrigerant following the vapor compression, heat-pump cycle in accordance with present invention under ideal conditions and under actual conditions, respectively.

An examination of the "ideal" pressure-enthalpy diagram shown in FIG. 6A reveals the following facts:

(a) the complete cycle consists of four lines;
(b) the length, as well as the location, of the line $$p=p_e$$

is determined by choosing the value of $p_e$ since the control system controls the state of the refrigerant so that the line (segment) starts on the liquid boundary line and ends on the vapor boundary line.

(c) the choice of the value of $p_c$ not only determines the location of the line $$p=p_c,$$

but also determines automatically the length of the segment, CF, and the lengths of the remaining two segments BC and FA, where BC is the isentropic compression line and FA is the constant-enthalpy throttlin line. It follows that the ideal cycle is determined unambiguously by the selection of the pressure $p_e$ and $p_c$.

Figure 6B:
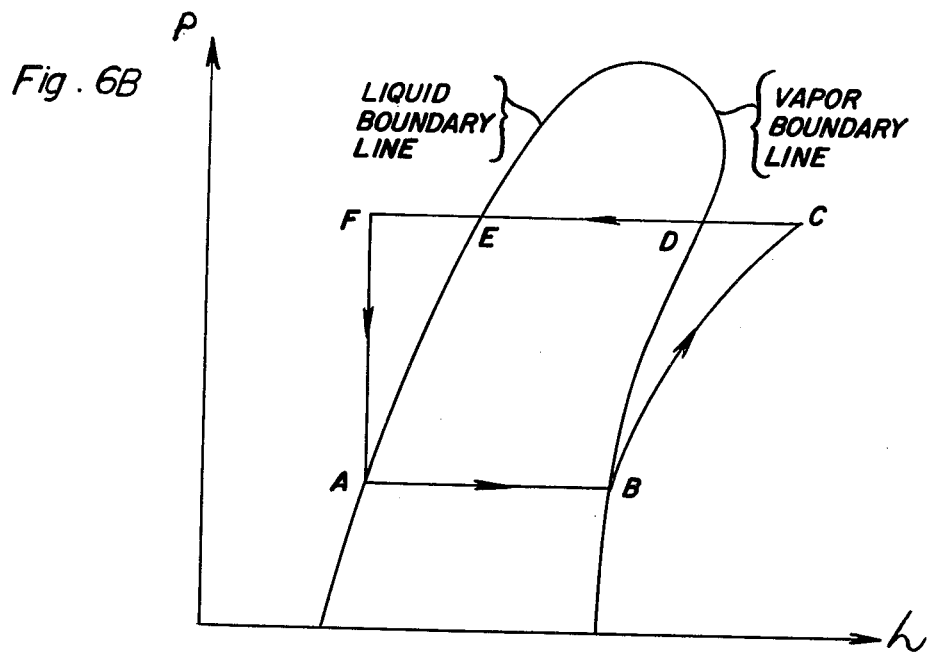

The foregoing statements remain true in essence in a "real" cycle, namely, one which the refrigerant would undergo in an actual (physical) installation. Such a cycle is shown in FIG. 6b.

The values of the pressures $p_e$ and $p_c$ are selected by the control system so that the desired value $\dot{Q}_e^{(d)}$ of $\dot{Q}_e$ and the desired value $\dot{Q}_c^{(d)}$ of $\dot{Q}_c$ are achieved, where $\dot{Q}_e$ is the rate at which the refrigerant in the solar collector and evaporator absorbs solar heat, and where $\dot{Q}_c$ is the rate at which the refrigerant in the condensing coil releases heat to the medium to be heated.

When the rate $\dot{Q}_c$ at which the refrigerant in the condensing coil releases heat to this medium can be controlled independently of the condenser temperature differential, the pressures $p_e$ and $p_c$ can vary independently. However, when the heat $\dot{Q}_c$ released to the medium can be controlled only by varying the condenser temperature differential, as for example, in most cases where the condensing coil is used to heat the storage medium of a latent heat reservoir, these two pressures cannot vary independently. The novel controls described next apply to both cases, except where otherwise explicitly stated.

These novel controls will, in general, receive certain inputs from a unit we shall refer to as the Central Control Unit (CCU) which may be a simple fixed-logic or small (pocket-size) programmable special-purpose computer.

Figure 7A:
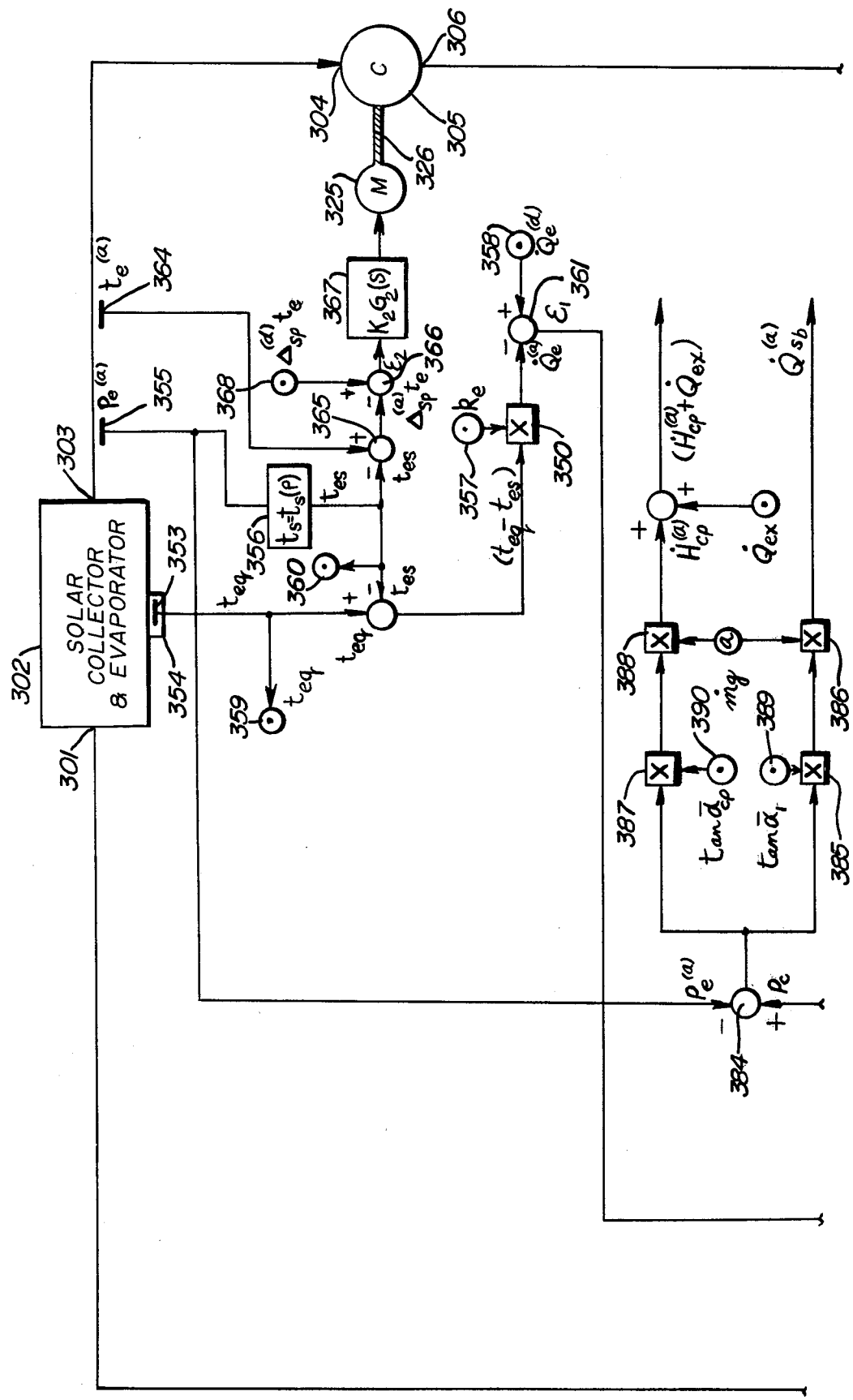
FIGS. 7a and 7b are a composite schematic flow diagram of the solar assisted, vapor compression heat pump cycle of the present invention with a typical control system therefor.
Figure 7B:
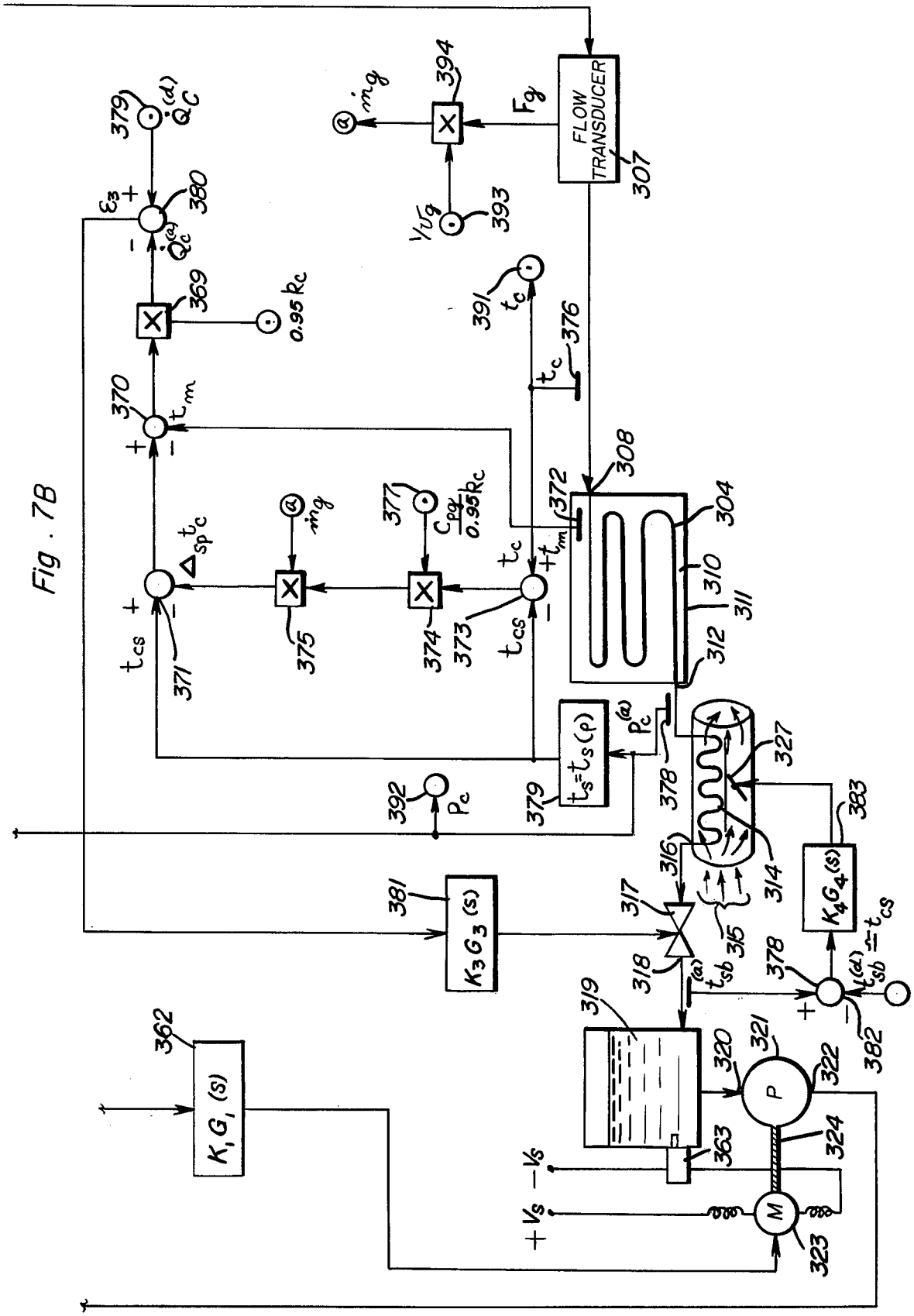

FIGS. 7A and 7B show a method of implementing the novel control system of this invention in the case where a latent heat reservoir is used.

The refrigerant enters at 301 the solar collector (and evaporator) 302 in state A (see FIGS. 6A and 6B) and exits at 303 in state B. In this state, the refrigerant enters at 304 compressor 305 and exits at 306 in state C, passes through flow transducer 307, and enters in this same state, at point 308 condensing coil 309 embedded in storage medium 310 of latent heat reservoir 311. It exits condensing coil 309, at point 312, in state E, and enters, in this same state, subcooler coil 314 over which flows ventilation air 315. The refrigerant exits subcooler coil 314 at point 316 in state F and, after passing through throttling valve 317, exits at point 318 in approx. state A. After passing through receiver (liquid reservoir) 319, it enters pump 321 at point 320 and exits from this pump at point 322 again in approx. state A. From this point, the liquid refrigerant is returned to inlet 201 of the solar collector (and evaporator).

The control system for the vapor compression heating cycle of this invention consists essentially of four servos.

The purpose of the servo controlling the electric motor 323 which drives pump 322 through shaft 324, is to ensure that the evaporator pressure $p_e$ assumes the value corresponding to the desired (chosen) value of $\dot{Q}_e$ and also to ensure that the refrigerant entering the evaporator at point 301 is in state A by causing the mass flow rate at which the liquid refrigerant enters at point 301 to match (namely to be equal to) the mass flow rate at which the refrigerant is evaporated in collector 302 by solar heat.

The purpose of the servo controlling electric motor 325 which drives compressor 305 through shaft 326, is to adjust the capacity of the compressor (only speed control shown) so that the mass rate at which refrigerant flows through the compressor matches the rate at which the refrigerant is being evaporated, and to ensure that dry vapor enters the compressor at point 304. To this end, the servo is controlled so as to provide a few degrees (say 5° F.) of superheat $\Delta_{sp}t_e$. (This superheat is not shown in the pressure enthalpy diagrams of FIGS. 6A and 6B because it is insignificant compared to the amount of superheat of the refrigerant at the compressor exit 306, and would distort the diagram.)

The purpose of the servo controlling the throttling valve 317 is to ensure that the condenser pressure $p_c$ assumes the value corresponding to the desired (chosen) value of $\dot{Q}_c$. The purpose of flow transducer 307 is to measure the mass flow rate of $\dot{m}_g$ of the working fluid in its vapor phase. The value of $\dot{m}_g$ is used by the servo controlling the throttling valve 317 in one of the embodiments of this servo.

The purpose of the servo controlling damper 327, whose position determines the amount of ventilation air 315 passing over coil 314, is to ensure that the liquid at exit point 316 is subcooled by the desired amount.

Referring to the servo motor 323, the actual value $\dot{Q}_e^{(a)}$ of $\dot{Q}_e$ corresponding to a given value of the evaporator pressure $p_e$ is derived from the evaporator capacity coefficient $k_e$, the refrigerant saturated vapor $t_{es}$ in the evaporator, and the radiation equilibrium temperature defined earlier. Multiplier 350 and adder 351 are used to instrument the equation $$\dot{Q}_e^{(a)} = k_e(t_{eq} - t_{es}). \tag{11}$$

The value of the temperature $t_{es}$ is derived by using the equation $$t_s = t_s(p) \tag{12}$$

which expresses the functional relationship of the saturated vapor temperature $t_s$ that corresponds to the refrigerant pressure p. This relation can be deduced, for any gven refrigerant, from published graphs and tables. The value of the radiation equilibrium temperature $t_{eq}$ is measured by temperature transducer 353 located in dummy collector 354. The pressure $p_e^{(a)}$ is measured by pressure transducer 355 and the corresponding saturated-vapor temperature $t_{es}$ is obtained from it by using function generator 356 to instrument the functional relationship $t_s\ t_s(p)$, which, as mentioned earlier, can be derived from published tables. Adder 351 and multiplier 350 are used to instrument the right hand side of equation (11) and thus obtain $Q_e^{(a)}$. The value $k_e$ is provided by the CCU, as indicated by symbol 357. The value of $\dot{Q}_e^{(d)}$ is provided either directly by the CCU, or indirectly by it in the manner described later. This fact is indicated by symbol 358. The value of $k_e$ is computed by the CCU as a function of $t_{eq}$ and $t_s$. This function, which is only a slowly varying function of $t_{eq}$ and $t_s$ can be determined by calibration tests and preprogrammed. The fact that the values of $t_{eq}$ and $t_{es}$ are supplied to the CCU is indicated by symbols 359 and 360, respectively.

The value $\dot{Q}_e^{(a)}$ obtained, as already described is subtracted from $\dot{Q}_e^{(d)}$ by using adder 361. The resulting servo error $$\epsilon_1 = \dot{Q}_e^{(d)} - \dot{Q}_e^{(a)}$$

controls the speed of motor 323, via servo amplifier and frequency-dependent network 362, so as to cause $\epsilon_1$ to tend to zero. To this end, the function $K_1\ G_1(s)$ must include an integration. A simple typical expression for this function is $$K_1 G_1(s) = K_1 \frac{1 + \tau_1 s}{s} \quad (13)$$

where $k_1$ is the amplifier gain $\tau_1$ is a smoothing constant and s is the laplace transform of the error $\epsilon_1(t)$.

The low limit float switch 363 is used to interrupt the power supply $s$ to motor 323 whenever the level of the liquid receiver 319 falls below a minimum preselected level. This prevents pump 321 from running dry.

Referring to the servo controlling electric motor 325, the desired value $\Delta_{sp}^{(d)} t_e$ of refrigerant superheat, at a point in the vicinity of exit 303, is used as the reference signal of this servo and is preselected. If different preselected values of $\Delta_{sp}^{(d)} t_e$ are desired for different operating conditions, they are provided by the CCU, as indicated by the symbol 368. The actual amount of superheat $\Delta_{sp}^{(a)} t_e$ is derived from the refrigerant pressure $p_e^{(a)}$ as measured by pressure transducer 355 and from refrigerant temperature $t_e^{(a)}$ as measured by temperature transducer 364. The saturated vapor temperature $t_{es}$ corresponding to the pressure $p_e^{(a)}$ is then subtracted from $t_e^{(a)}$ by using adder 365. The value of the saturated vapor temperature $t_{es}$, corresponds to the measured pressure $p_e^{(a)}$, is obtained by using function generator 356 to instrument the functional relation $t_s = t_s(p)$ between the value of the saturated vapor $t_s$ corresponding to a given pressure p. This functional relation can (as mentioned earlier) be deduced, for any given refrigerant, from published graphs and tables. Pressure transducer 355 and temperature transdcuer 364 are both located in the vicinity of exit 303. The difference $$\epsilon_2 = \Delta_{sp}^{(d)} t_e - \Delta_{sp}^{(a)} t_e, \quad (14)$$

obtained by using adder 366, is used as the servo error signal. This signal, by means of servo-action, controls the speed of electric motor 325, via servo amplifier and frequency dependent network 367. The capacity of the compressor 305 can also be varied directly by such mechanisms as cylinder unloading, in conjunction with or in addition to motor speed control.

To the end of controlling the motor speed, the transfer function $K_2 G_2(s)$ must also include an integration. A typical simple expression for $K_2 G_2(s)$ is given by $$K_2 G_2(s) = K_2 \frac{1 + \tau_2 s}{s}, \quad (15)$$

where the symbols have a similar meaning to those given in equation (13).

Referring to the servo controlling the throttling valve 317, the actual value $\dot{Q}_c^{(a)}$ of $\dot{Q}_c$ corresponding to a given value of the condenser pressure $p_c^{(a)}$ is derived from the condenser capacity coefficient $k_c$, the refrigerant saturated vapor temperature $t_{cs}$ in the condenser, the amounts of refrigerant superheat $\Delta_{sp} t_c$ in the vicinity of the entrance 308 to condensing coil 309, and the temperature $t_m$ of the medium to be heated. Multiplier 369 and adders 370 and 371 are used to instrument the equation relating to these quantities; namely, $$\dot{Q}_c^{(a)} = 0.95 k_c [(t_{cs} - \Delta_{sp} t_c) - t_m]. \quad (16)$$

The value of $t_m$ is measured by temperature transducer 372. The value of $\Delta_{sp} t_c$ is derived from the measured value $t_c$ of the refrigerant temperature in the vicinity of entrance 308, the refrigerant constant pressure specific heat $c_{pg}$, the condenser capacity coefficient $k_c$, the saturated vapor temperature $t_{cs}$, and the mass flow rate $\dot{m}_g$ of the refrigerant at some point between the compressor exit 306 and the condensing coil entrance 308. Adder 373 and multipliers 374 and 375 are used to instrument the equation relating $\Delta_{sp} t_c$, $t_c$, $c_{pg}$, $k_c$, $\dot{m}_g$ and $t_{cs}$; namely, the equation $$\Delta_{sp} t_c = \frac{c_{pg} \dot{m}_g (t_c - t_{cs})}{0.95 k_c} \quad (17)$$

where in turn $c_{pg}$ can be found in published tables for a given refrigerant and temperature range, $t_c$ is measured by temperature transducer 376, $k_c$ is known from design or calibration data, and $\dot{m}_g$ is, as explained later, obtained from flow transducer 307. As indicated by symbol 377, the quantity $c_{pg}/0.95k_c$ is supplied by the CCU and the value of $t_{cs}$ is obtained from the value of $p_c^{(a)}$, as measured by pressure transducer 378, by means of equation $$t_s = t_s(p) \quad (12)$$

Equation (12) is instrumented using function generator 379, which is identical to functional generator 356.

The value of $\Delta_{sp} t_c$ can, alternatively, be obtained by instrumenting equation $$\Delta_{sp} t_c = \frac{(p_c - p_e)[\tan\overline{\alpha}_{cp} - \tan\overline{\alpha}_2]}{c_{pg}} \quad (18)$$

where $p_c$ and $p_e$ are measured by the same means used in instrumenting equation (17); where $c_{pg}$ is found as mentioned earlier; and where $$\overline{\tan \alpha_2} = \int_{p_e}^{p_c} \tan[\alpha_2(p)] dp \quad (19)$$

and $$\overline{\tan \alpha_{cp}} = \int_{p_e}^{p_c} \tan[\alpha_{cp}(p)] dp \quad (20)$$

where, in turn $\alpha_2$ and $\alpha_{cp}$ are the angles defined in FIG. 6A. The expressions (19) and (20) are computed by the CCU. The functions $\alpha_2(p)$ and $\alpha_{cp}(p)$ can be deduced from published pressure-enthalpy diagrams for a given refrigerant.

The value of $\dot{Q}_c^{(a)}$, obtained as described, is subtracted from the desired value $\dot{Q}_c^{(d)}$ of $\dot{Q}_c$, which is, as indicated by the symbol 379, supplied by the Central Control Unit (CCU) (either directly or indirectly) by using adder 380. The resulting servo error signal $\epsilon_3$, drives throttling valve 317, via servo amplifier and frequency-dependent network 381, represented by transfer function $K_3G_3(s)$, so as to make $\dot{Q}_c^{(a)}$ tend toward $\dot{Q}_c^{(d)}$. In this case, the transfer function does not include an integrator. A typical simple expression for this transfer function is $$K_3G_3(s) = K_3(1 + \tau_3 s), \quad (21)$$

where the symbols have a similar meaning to those given in connection with equation (13).

Referring to the servo controlling damper 327, the desired value $t_{sb}^{(d)}$ for the reference servo signal is, for the case of full subcooling, equal to the saturated vapor temperature $t_{es}$ of the evaporator plus, if desired, some small margin $\Delta t_{es}$ (not shown in FIG. 7). $\Delta t_{es}$ is a positive quantity. The servo error signal $\epsilon_4$ is obtained by substracting the actual value $t_{sb}^{(a)}$ of $t_{sb}$, as measured by temperature transducer 381, from $t_{sb}^{(d)}$ using adder 382. The error signal drives, via servo amplifier and frequency-dependent network 383, represented by transfer function $K_4G_4(s)$, damper 327 (which may contain its own small electric motor) in such a way as to make $t_{sb}^{(a)}$ tend toward $t_{sb}^{(d)}$. Again, no integration is contained in the transfer function, and a simple typical expression for this transfer function is $$K_4G_4(s) = K_4(1 + \tau_4 s), \quad (22)$$

where the symbols have a similar meaning to those given in connection with equation (13). All four of the transfer functions mentioned may contain higher order terms. However, the first two must give a constant output whenever the servo error signal is zero, whereas the last two must give a zero output whenever the servo error signal is zero.

The control system discussed so far allows the CCU to select $\dot{Q}_e$ and $\dot{Q}_c$ while maintaining the desired degree of superheat at exit 303 and "full subcooling", as defined earlier. The values of $\dot{Q}_e$ and $\dot{Q}_c$ cannot, howver, be selected independently. The CCU must therefore select compatible values of $\dot{Q}_e$ and $\dot{Q}_c$. More specifically the foregoing two quantities are related by $$\dot{Q}_c = \dot{Q}_e - \dot{Q}_{sb} + \dot{H}_{cp} + \dot{Q}_{ex}, \quad (23)$$

wheren $\dot{Q}_{sb}$ is the rate at which heat is released by the subcooler, $\dot{H}_{cp}$ is the rate at which enthalpy of the refrigerant is increased in the compressor, and $\dot{Q}_{ex}$ is the net amount of heat supplied to the refrigerant by the surroundings, excluding $\dot{Q}_c$, $\dot{Q}_e$ and $\dot{Q}_{sb}$, but including the heat from the electric motor(s) driving the compressor(s) where hermetically sealed compressors are employed. One major component of $\dot{H}_{ex}$ in poorly insulated installations is the heat entering or leaving the refrigerant piping. The value of $\dot{H}_{ex}$, whenever it is significant, can be obtained from calibration tests and programmed in the CCU. However, because the servo controlling the subcooling rate $\dot{Q}_{sb}$ is controlled independently of the other three servos, any small error made in determining the values of $\dot{Q}_c$, $\dot{Q}_e$, $\dot{H}_{cp}$ and $\dot{Q}_{ex}$, are compensated automatically by the servo controlling the subcooling rate.

It follows from the foregoing discussion that, in addition to obtaining $\dot{Q}_{ex}$ by calibration tests in cases where the value of this quantity is significant, the values $\dot{Q}$ and $\dot{H}_{cp}$ must also be computed. To this end, I use the expressions $$\dot{Q}_{sb} = \dot{m}(p_c - p_e) \cdot \tan \overline{\alpha}_1 \quad (24)$$

and $$\dot{H}_{cp} = \dot{m}(p_c - p_e) \tan \overline{\alpha}_{cp} \quad (25)$$

In theory, the value of $\dot{m}$ in equation (24) should be obtained from a flow transducer located between the condensing coil and the subcooler, and the value of $\dot{m}$ in equation (25) should be obtained from the transducer located between the compressor and the condenser. The system can be designed, however, with small enough transients for the value of the mass flow rate $\dot{m}_g$, obtained from flow transducer 307, to be used to instrument both equations. This is the case for the system shown in FIGS. 7A and 7B.

Equation (24) is instrumented by using adder 384 and multipliers 385 and 386. Equation (25) is instrumented by using adder 384 and multipliers 387 and 388. The quantities $\tan \overline{\alpha}_1$, $\tan \overline{\alpha}_{cp}$ are supplied by the CCU as indicated by symbols 389 and 390, respectively. The quantity $$\overline{\tan \alpha_1} = \int_{p_e}^{p_c} \tan[\alpha_1(p)] dp, \quad (26)$$

and the quantity $\tan \overline{\alpha}_{cp}$ is given by equation (20). The quantity $\dot{m}_g$ is obtained from the volumetric flow rate $F_g$, supplied by flow transducer 307, by multiplying $F_g$ by $1/v_g$, where $v_g$ is the specific volume of the refrigerant.

The quantity $1/v_g$ is computed by the CCU as a function of $t_c$ and $p_c$. This function can be deduced from published graphs and tables and preprogrammed. The symbols 391 and 392 indicate that $t_c$ and $p_c$ are supplied to the CCU, and symbol 393 indicates that $1/v_g$ is supplied by the CCU to multiplier 394.

Before proceeding to discuss the instrumentation of equation (23), it is important to recognize that there exists a large number of different ways of implementing the control concepts for the vapor compression heating cycle illustrated in FIGS. 7A and 7B. Two alternative ways of expressing and instrumenting the quantity $\Delta_{sp} t_c$ have already been mentioned. An example of an alternative way of instrumenting another quantity, namely the refrigerant mass flow rate $\dot{m}$, can be mentioned. This rate could have been obtained without flow transducer 307 and the associated computation, by instrumenting the equation $$\dot{m} = \frac{k_e(t_{eq} - t_{es})}{h_{fg}(p_e)}, \quad (27)$$

where $h_{fg}(p_e)$ is the latent heat absorbed by the refrigerant in the evaporator when "full subcooling" is used. Hence, it should be apparent to those skilled in the art that there are many techniques for instrumenting the control featurs of the instant invention without departing from my inventive concepts.

Turning to equation (23). Except for the quantity $\dot{Q}_{ex}$, which is fixed by the design, and cannot be changed during operation, the CCU could, in principle, choose according to programmed rates the value of any one of the remaining quantities in this equation. In practice, $\dot{Q}_{sb}$ would rarely be chosen as the independent variable. Briefly, if it is desired to change the amount of heat released to the entering ventilation air, one would normally do this by supplementing $\dot{Q}_{sb}$ by other means. Also since $\dot{H}_{cp}$ represents approximately the work done by the compressor(s), constraints may be imposed upon the value of $\dot{H}_{cp}$, which can be accomplished quite simply with the type of control system presently discussed, but one would not normally wish to choose $\dot{H}_{cp}$ as an independent variable whenever compressor capacity can be changed continuously—as assumed heretofore. Often, however, compressor capacity can only be changed in steps. In this case, the CCU can be programmed to select the capacity step that best meets a desired objective expressed in terms of another variable, such as $\dot{Q}_e$; and, after this has been accomplished, the particular value of $\dot{H}_{cp}$ corresponding to that step can be used as the independent variable, and the quantities $\dot{Q}_e$, $\dot{Q}_c$, $\dot{Q}_{sb}$, controlled so as to assume values consistent with that particular value of $\dot{H}_{cp}$. One may wish, depending on the application to choose either $\dot{Q}_e$ or $\dot{Q}_c$ as the independent variable, or one might also wish to choose the rate $\dot{Q}_h$ defined by $$\dot{Q}_h = \dot{Q}_c + \dot{Q}_{sb},$$

or the theoretical coefficients of performance $$(COP)_{th} = \frac{\dot{Q}_h}{\dot{H}_{cp}} \text{ or } (COP)_{th}' = \frac{\dot{Q}_c}{\dot{H}_{cp}},$$

or the actual coefficients of performance $$(COP) = \frac{\dot{Q}_h}{P_i} \text{ or } (COP)' = \frac{\dot{Q}_c}{P_i}$$

as the independent variable, where $P_i$ may be either the electrical power consumed by the compressor(s), or by the compressor(s) and the pump(s) and possibly the fans (blowers) associated with a system.

Figure 10A:
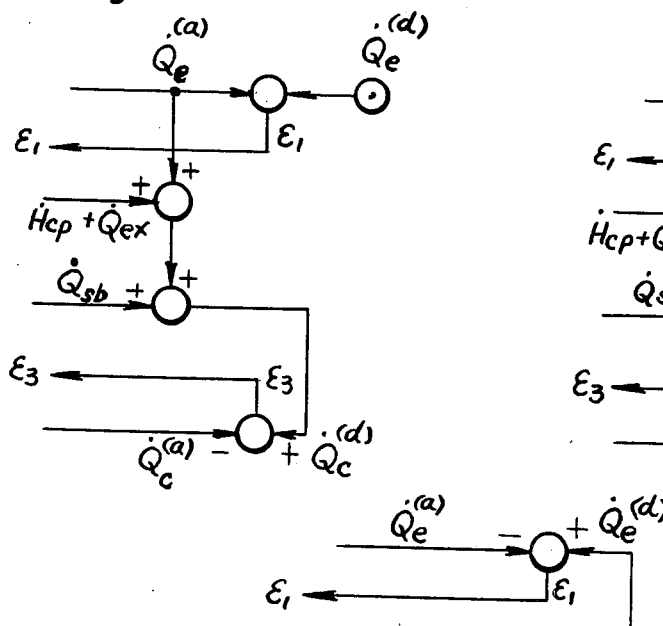
FIGS. 10a, 10b and 10c are schematic control diagrams which illustrate methods for choosing how $\dot{Q}_e$, $\dot{Q}_c$ and $\dot{Q}_h/\dot{H}_{cp}$ can be chosen as the independent variable in the solar-assisted, vapor-compression, heat-pump cycle.
Figure 10B:
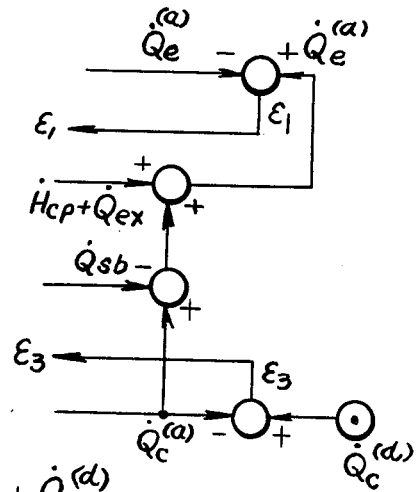
Figure 10C:
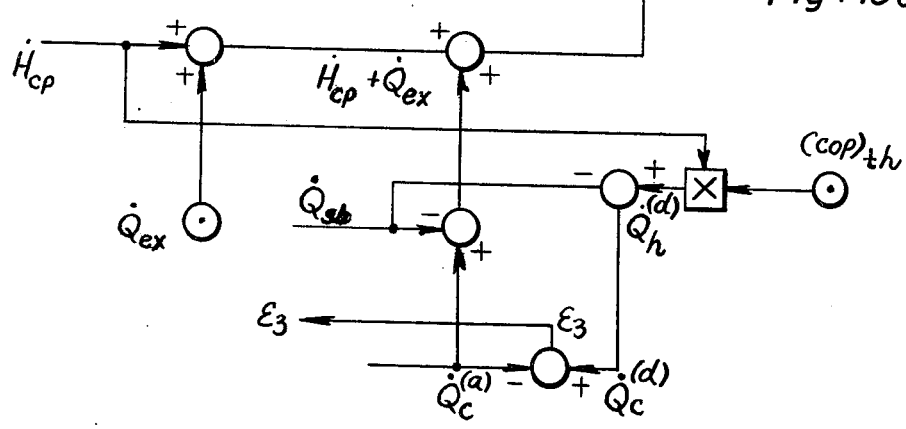

The diagrams in FIGS. 10A–C show how $\dot{Q}_e$, $\dot{Q}_c$ and $\dot{Q}_h/\dot{H}_{cp}$ can be chosen as the independent variable. The method for choosing the remaining three quantities, or any other quantity from which either $\dot{Q}_e^{(d)}$ or $\dot{Q}_c^{(d)}$ can be derived, should be obvious to those skilled in the art.

The foregoing novel controls assume that the solar collector uses the type of evaporator described under solar collector and referred to therein as "the evaporator". This evaporator resembles functionally the type of evaporator referred to by those skilled in the art as a "flooded evaporator". The foregoing control apply, in essence, to any flooded evaporator whose source of heat is radiant energy.

In some installations employing multiple flooded evaporators it may be necessary to add individual low-pressure float controls fed by a single pump, or float switches controlling separate liquid pumps supplied from the same receiver (liquid refrigerant reservoir). In particular, such float controls will probably be required in large solar collector installations for each row or group of rows of collector modules.

AIR-ASSISTED, VAPOR-COMPRESSION HEATING CYCLE

The foregoing discussion under the heading SOLAR-ASSISTED, VAPOR-COMPRESSION CYCLE applies, in essence, also to the air-assisted, vapor-compression cycle with the following exceptions: (1) the rate $\dot{Q}_e$ at which heat can be absorbed by the device "collecting" atmospheric heat does not have a precise upper limit; instead it can be increased far beyond the system design capacity which is limited primarily by compressor capacity; and (2) "full subcooling" as defined cannot be achieved.

The description of the novel controls for the solar-assisted, vapor-compression cycle also applied in essence, to the air-assisted, vapor-compression heating cycle with the following exceptions: (1) the value of $\dot{Q}_e^{(a)}$ is obtained by instrumenting the equation $$\dot{Q}_e^{(a)} = k_e(t_a - t_{es})$$

instead of equation (11), where $t_a$ is the temperature of the air surrounding the device collecting atmospheric heat and the other symbols have the same meaning as those given in connection with equation (11); (2) the value of $k_e$ usually remains constant within the normal operating range of the equipment (as governed primarily by compressor capacity); and (3) the reference signal for the servo controlling damper 327 in FIG. 7B is no longer $t_{es}$ but some other attainable higher temperature, say 15° F., above the temperature $t_a$, whose precise value depends on system design and operating conditions and is supplied by the CCU.

The foregoing applies equally to any vapor-compression heating cycle in accordance with the present invention which obtains its thermal energy from a medium at a uniform temperature in which the "heat-collecting" device is embedded or immersed, such as in a lake or artesian well, provided the temperature of this medium is substituted for the temperature $t_a$ of the air.

COMBINED RANKINE POWER CYCLE AND VAPOR-COMPRESSION COOLING CYCLE

A heat engine powered by solar radiation and employing a refrigerant as a working fluid is old, and so is the use of such an engine to drive a vapor-compression cooling cycle. However, no one prior to the instant invention has conceived an arrangement for using a solar radiation powered heat engine to drive a vapor-compression cooling cycle in which (1) a single (binary-phase) working fluid and in particular, a refrigerant is shared by both the engine's Rankine Power cycle and the cooling cycle; (2) a single condensing unit is shared by both cycles; (3) the radiation equilibrium temperature of the heat absorbing panel is used to predict the available engine power for a given installation, (4) the control system ensures, in the particular manner described later, that the working fluid and, in particular, refrigerant passing through the heat engine is preheated before it is returned to the solar collector by the amount required to cause the temperature of this refrigerant to be almost equal to that of the saturated-vapor temperature in the evaporator before the refrigerant is returned to the evaporator; (5) the control system ensures, in essence, that only the heat absorbed by the working fluid and, in particular, the refrigerant at the uniform temperature of the solar collector is supplied to the heat engine, and that the remaining working fluid bypasses the engine thus requiring a smaller engine to obtain the same performance for a given amount of solar heat absorbed, and (6) the control system allows the saturated-vapor temperature $t'_{es}$ of the refrigerant in the solar collector, and the refrigerant mass flow rate $m_p$ through it, to be chosen independently of the degree of insolation so as to optimize selected performance objectives (criteria). After reading the discussion of the vapor-compression heating cycle given earlier it will be obvious to those skilled in the art how with the type of controls described in the present invention, the combined power and cooling cycle can be controlled in other ways to achieve a variety of objectives similar to those requiring for example, a given value of cooling rate, or the maximization of the coefficient of performance of the combined cycle. The number of possible alternative objectives however is greater here because of the presence of two cycles instead of one which may, within limits, be controlled independently. In effect, to this end, one need only derive similar expressions and impose applicable constraints—in the manner done earlier—by examining the applicable pressure-enthalpy diagram.

Figure 8A:
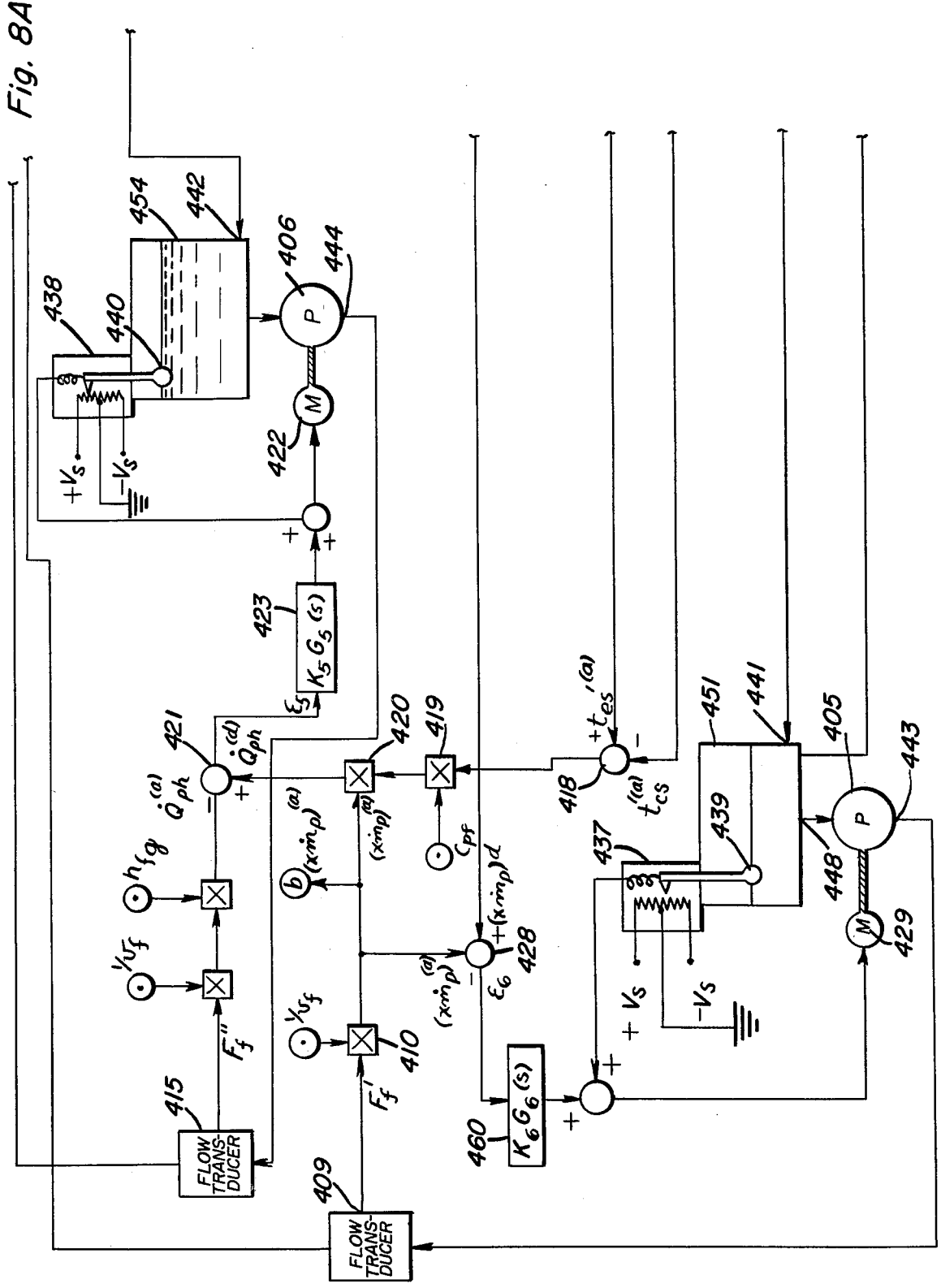
FIGS. 8a and 8b are a composite schematic flow diagram of the combined Rankine-power cycle and air-source, vapor-compression cooling cycle of the present invention with a typical control system therefor.
Figure 8B:
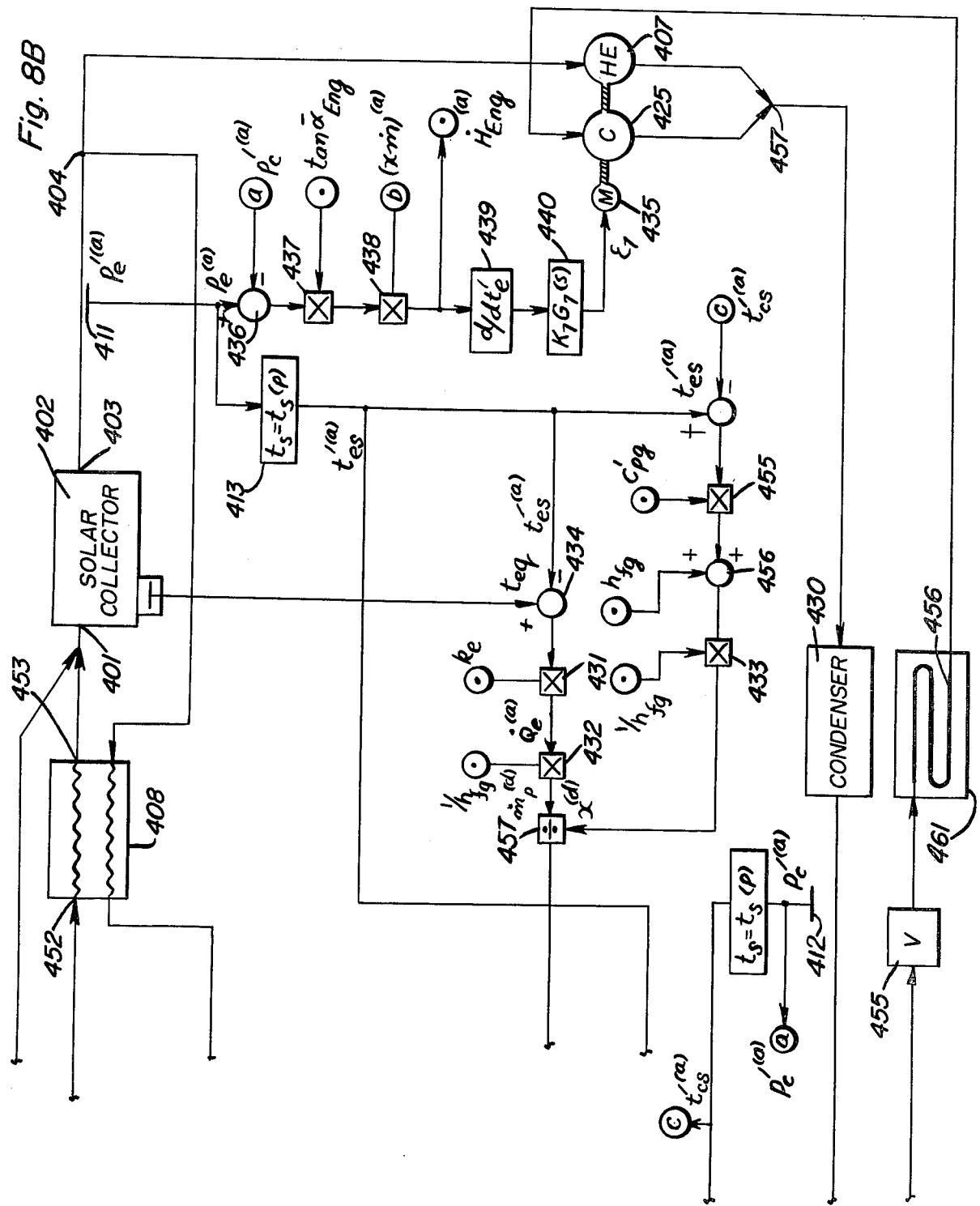

The system shown in FIG. 8 illustrates the particular case where the objective chosen is the maximization of the thermodynamic enthalpy rate $\dot{H}_{Eng}$ of the heat engine, whenever its magnitude exceeds a minimum preassigned value, in the simple case where the vapor-compression cooling cycle is not controlled independently, and the refrigerant flow rate through the cooling cycle evaporator is controlled by a thermostatic expansion valve in a conventional manner.

Each of the foregoing six features are accomplished by the present invention.

Referring now to FIG. 8, the refrigerant enters solar collector 402 at point 401. After the refrigerant exits at point 403 it is apportioned at point 404 in part by pumps 405 and 406, and in part by flow control means described later, between heat engine 407 and heat exchanger 408. The fraction $x\dot{m}_p$ of the refrigerant flow rate $\dot{m}_p$ through the solar collector apportioned to the heat engine 407 flows through the outdoor condenser 430, the receiver 451 and is returned by pump 405 to solar collector 402 after passing through flow transducer 409 and through heat exchanger 408, entering at point 452 and existing at point 453. The fraction $(1-x)\dot{m}_p$ of the refrigerant apportioned to heat exchanger 408, after traversing it, flows through receiver 454 and is returned to solar collector 402 by pump 406 after passing through flow transducer 415. The receiver 451 supplies, in addition to pump 405, expansion valve 455, evaporating coil 456, and compressor 425, of the vapor-compression cooling cycle. As will be appreciated, a conventional vapor compression cooling cycle is employed in this illustrated embodiment of the invention and includes expansion valve 455, evaporating coil 456 of evaporator 461, compressor 425, outdoor condenser 430 and receiver 451. Thus condenser 430 serves both the Rankine power cycle and the cooling cycle simultaneously. The refrigerant, after passing through the compressor 425, merges with the refrigerant traversing engine 407 at point 457 and is returned to receiver 451 after passing through condenser 430.

The fraction $(x\dot{m}_p)$ of the total refrigerant flow rate $\dot{m}_p$ through the solar collector which is apportioned to the heat engine is determined by instrumenting the equation $$[(1-x)\dot{m}_p]^{(a)} = (x\dot{m}_p)^{(a)} \cdot c_{pf}(t_{es}'^{(a)} - t_{cs}'^{(a)}) \tag{28}$$

solved for x, to obtain the desired value of $x^{(d)}$ of x, namely $$x^{(d)} = x = \frac{h_{fg}}{h_{fg} + c_{pf}(t_{es}'^{(a)} - t_{cs}'^{(a)})} \tag{29}$$

where the quantity $(x\dot{m})^{(a)}$ is the actual steady-state mass flow rate apportioned to the heat engine 407, as deduced from flow transducer 409 and the refrigerant liquid density $1/v_f$ using multiplier 410; $c_{pf}$ is the average specific heat of the refrigerant flowing through heat exchanger 408, as supplied by the CCU, in terms of temperatures $t_{es}'^{(a)}$ and $t_{cs}'^{(a)}$, which are in turn obtained from pressure transducers 411 and 412, and function generators 413 and 414; where is the actual steady-state mass flow rate apportioned to the heat exchanger 408, as deduced from flow transducer 415 and the refrigerant liquid-density or density $1/v_f$ using multiplier 416; and where $h_{fg}$ is the latent heat per unit of refrigerant mass at the pressure $p_e$. As in earlier figures, the symbol ⊙ indicates throughout that the associated quantity is supplied by, or supplied to the CCU. The applicable alternative is indicated by the direction of the arrow. The left-hand side of equation (28) is denoted hereafter by the symbol $\dot{Q}_{ph}^{(a)}$ and the right hand side by $\dot{Q}_{ph}^{(d)}$. The quantity $\dot{Q}_{ph}^{(a)}$ is obtained from $[(1-x)\dot{m}_p]^{(a)}$ by multiplying it by $h_{fg}$ using multiplier 417. $Q_{ph}^{(d)}$ is obtained from $t_{es}'^{(a)}$ and $t_{cs}'^{(a)}$ using adder 418 to obtain $(t_{es}'^{(a)} - t_{cs}'^{(a)})$. This last expression is multiplied first by $c_{pf}$, using multiplier 419, and next by $(xm_p)^{(a)}$, using multiplier 420, to obtain $Q_{ph}^{(d)}$. The error signal $$\epsilon_5 = \dot{Q}_{ph}^{(d)} - \dot{Q}_{ph}^{(a)} \tag{30}$$

is formed using adder 421 and is used to control electric motor 422, via an appropriate servo-amplifier and frequency-dependent network 423, represented by transfer function $K_5G_5(s)$. The motor 422 in turn, drives pump 406. The desired value $x^{(d)}$ of x, as determined by equation (29), is derived by instrumenting this equation, as shown in FIG. 8, using multipliers 425 and 426 and adder 427.

The error signal $$\epsilon_6 = (x\dot{m}_p)^{(d)} - (x\dot{m}_p)^{(a)} \tag{31}$$

is used to control motor 429 via servo-amplifier and frequency-dependent network 460, represented by transfer function $K_6G_6(s)$, which in turn drives pump 405. The quantity $(x\dot{m})^{(d)}$ is obtained, as shown in FIG. 8 using pressure transducer 411, function generator 413, multipliers 431, 432, 433, and 455, and adder 434 and 456 and divider 457. The error signal $\epsilon_6$ is obtained by using adder 428.

The compressor 425 is driven by heat engine 407 or electric motor 435 or by both. In FIG. 8, the last of these three cases is illustrated. The rate at which the heat engine can deliver the thermodynamic work $\dot{H}_{Eng}$ is given by $$\dot{H}_{Eng} = (P_e'^{(a)} - P_c'^{(a)}) \cdot \tan \bar{\alpha}_{Eng} \cdot (x \dot{m}_p)^{(a)}. \tag{32}$$

This expression is computed in this particular form of the embodiment in terms of $P_e'^{(a)}$, $P_c'^{(a)}$, $(x\dot{m}_p)^{(a)}$ obtained as described earlier in connection with the vapor-compression heating cycle, and the quantity $\tan \bar{\alpha}_{Eng}$ computed and supplied by the CCU in the same manner as the quantities $\tan \bar{\alpha}_1$, $\tan \bar{\alpha}_2$, $\tan \bar{\alpha}_{cp}$, discussed earlier in connection with the vapor-compression heating cycle. The subtraction in equation (32) is made using adder 436 and multiplier 437 and 438.

The value of $\dot{H}_{Eng}^{(a)}$ is zero when $$t_{es}'^{(a)} = t_{eq} \text{ or } t_{es}'^{(a)} = t_a \tag{33}$$

For a value of $t_{es}'^{(a)}$ between these two extreme values, $\dot{H}_{Eng}^{(a)}$ attains its maximum. This value may, for given values of $t_{eq}$ and the temperature $t_a$ of the ambient air, be a function, of $t_{es}'$ alone, or of both $t_{es}'$ and $t_{cs}'$ varying independently. If the vapor-compression cooling cycle is not controlled independently of the power cycle and if the coefficient of capacity $k_c'$ of the condenser 430 shared by both cycles cannot be varied, the first alternative applies because $t_{cs}'$ cannot be varied independently of $t_{es}'$. This is the case illustrated in FIG. 8. In this case, the maximum value of $\dot{H}_{Eng}$ is obtained when the derivative of $\dot{H}_{Eng}$ with respect to $t_{es}'$ is zero. Consequently, to maximize $\dot{H}_{Eng}$, the derivative is obtained by using the differentiator 439 and the resulting quantity is used as the error signal driving electric motor 435 via servo amplifier and frequency-dependent network 440 represented by the transfer function $K_7G_7(s)$. This motor regulates, in turn, the speed of compressor 425 and heat engine 407, and thus ensures that this heat engine operates at a speed which results in the maximum value of $\dot{H}_{Eng}$. The temperature $t_{es}'^{(a)}$ of the refrigerant in the solar collector is, for given values of $t_{eq}$ and $t_a$, controlled by this speed. Whenever the value of $\dot{H}_{Eng}$ supplied to the CCU falls below a minimum preselected value, the CCU provides a signal that disconnects, by using a clutch (not shown) or other means, the compressor from the engine drive. Under these conditions, whenever cooling is required, the compressor 425 is driven by motor 435 alone.

It should be apparent from the foregoing discussion of the combined power and cooling cycles how the first and second of the six features listed earlier are accomplished. I now elaborate on the way the remaining three features are accomplished.

The prediction of the available engine power corresponding to a given value of $t_{eq}$ and $t_a$ depends on the method chosen to control the engine speed and the cooling cycle. In general, the value $\dot{H}_{Eng}$ can be predicted by computing in the CCU the value of $m_p$, corresponding to given values of $t_{eq}$ and $t_a$, from $$\dot{m}_p = \frac{k_e[t_{eq} - t_{es}'(p_e')]}{h_{fg}(p_e')} \tag{34}$$

the value $h_{Eng}$ of $\dot{H}_{Eng}$ per unit mass from $$h_{Eng} = (P_e' - P_c') \cdot \tan \alpha_{Eng}(P_e', P_c') \tag{35}$$

and by multiplying $\dot{m}_p$ by $h_{Eng}$ to obtain $$\dot{H}_{Eng} = \dot{m}_p h_{Eng}, \tag{36}$$

However, the value of $p_c'$ in equation (35) will depend on the particular method chosen to control the engine and the cooling cycle. For the particular method illustrated in FIG. 8, $p_c'$ can be determined for a given installation by calibration tests as a function of $t_{eq}$, $p_e'$ and $t_a$. Consequently, in this case, for given values of $t_{eq}$ and $t_a$, $\dot{H}_{Eng}$ is a single-valued function of $p_e'$ or equivalently of $t_{es}'$ and the available engine power can be predicted from $\dot{H}_{Eng}$ for any assumed value of $t_{es}'$ and, in particular for the value of $t_{es}'$ for which $$\frac{d(\dot{H}_{Eng})}{dt_{es}'} = 0. \tag{36}$$

The value of $\dot{H}_{Eng}$ thus determined gives the theoretical power available. The corresponding available shaft or brake horsepower can in turn be derived by multiplying this value by the overall engine efficiency.

How the fourth and fifth features are accomplished under steady state conditions and with perfect calibrations should be clear from the earlier discussion. However, to ensure that these two features are accomplished in the absence of perfect calibrations and steady state conditions, additional controls must be used. These controls consist of potentiometers 437 and 438 which add a bias to the voltage controlling the speed of motors 429 and 422, respectively, whenever floats 439 and 440 respectively, deviate from a preassigned reference level. These bias voltages, by slowing down or speeding up the motor they control so as to maintain the level in receivers 451 and 454 approximately constant ensure that the rates of evaporation in condenser 430 and in heat exchanger 408 adjust themselves automatically. Thus, the flow rates $(x\dot{m}_p)^{(a)}$ and $[(1-x)\dot{m}_p]^{(a)}$ satisfy equation (28) at points 441 and 442 before the refrigerant enters receivers 451 and 454, respectively, as well as exit point 443 and 444 after the refrigerant leaves pumps 405 and 406 respectively. Steady state biases in system calibration are compensated by differences in the steady state levels of the liquid refrigerants in receivers 451 and 454. The bias voltage generated by potentiometer 437 is applied to motor 429 using adder 443 and that generated by potentiometer 438 is applied to motor 422.

TYPICAL HEATING AND COOLING SYSTEM FOR BUILDINGS

Figure 9A:
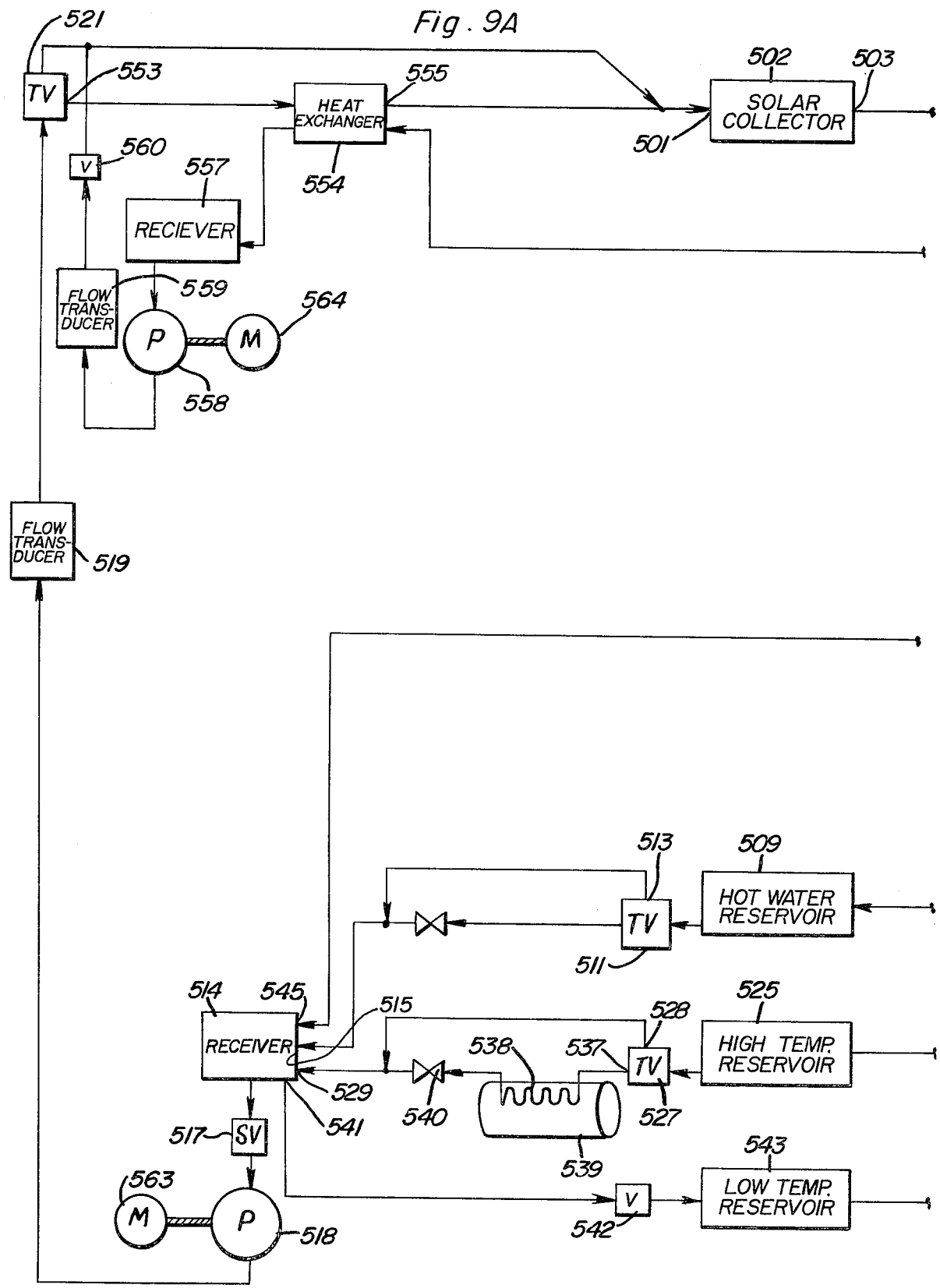

FIG. 9 illustrates a typical embodiment in accordance with the present invention of a heating and cooling system using all five of the cycles described in the preceding sections. In this particular embodiment, a hot water supply reservoir 509 is heated directly by an immersed condensing coil (not shown), and a high temperature latent heat reservoir 525 and a low temperature latent heat reservoir 543, are respectively, heated and cooled. The reservoirs 501 and 502 may then in turn be used to heat or cool a chosen fluid which distributes heating or cooling, for example, within a building, by techniques presently well known to those skilled in the art.

In the system illustrated in FIG. 9, the hot water supply 509 and the high temperature storage medium 525 can be heated by using either the Rankine type heat transfer cycle, the solar-assisted vapor-compression heating cycle, or the air-assisted vapor compression heating cycle. I shall refer to these cycles as Modes H1a, H2a, H3a and Modes H1b, H2b, H3b, where the letter "a" refers to cycles heating the hot water supply reservoir and the letter "b" refers to cycles heating the high temperature reservoir. I shall refer to the combined Rankine power cycle and air-source, vapor-compression cooling cycle as Mode P & C, and to the latter cycle alone as Mode C.

In the system illustrated in FIG. 9, the evaporator in the solar collector 503 is used to absorb solar heat and, as appropriate, atmospheric heat, as previously described.

In FIG. 9, only the refrigerant circuits (loops) and flow devices are shown. Controls are omitted. The flow transducers are used only in the appropriate modes. The refrigerant circuits used in each mode are indicated by the symbols defined earlier. The pumps are designed by P, the motors driving the pumps by M, the compressor by C, the heat engine by E, the transfer valve by TV and the start-stop valves by SV.

In mode H1a, the refrigerant enters solar collector 502 at point 501 and exits a point 503. Next, the refrigerant traverses (solenoid-actuated) transfer valve 504, exits at point 505, traverses (servo-controller) throttling valve 506 enters transfer valve 507 and exits at point 508, traverses the coil (not shown) of hot-water supply reservoir 509, exits transfer valve 511 at point 513, and enters receiver 514 at point 515.Finally, the refrigerant exits receiver 514 at point 516, traverses valve 517, and is returned by pump 518 to solar collector 502 after traversing flow transducer 519, and transfer valve 520 from which it exits at point 521. Valve 561 is a safety valve.

In mode H1b the refrigerant follows the same path as in mode H1a, except that instad of entering transfer valve 507, it enters transfervalve 522 at point 523, and traverses successively flow transducer 524 the coil (not shown) of indoor condenser and high temperature reservoir 525 and transfer valve 527 from which it exits at point 528, and finally enters receiver 514 at point 529. Thereafter the refrigerant exits this receiver at point 516 and follows the same path back to the solar collector 502 as in Mode H1a.

In mode H2a, the refrigerant exits the solar collector 502 at point 503, traverses transfer valve 504 exiting at point 530, traverses transfer valve 531 existing at point 532, traverses compressor 533, transfer valve 534, 535 and 507, the coil in the hot-water supply reservoir 509, transfer valve 511, throttling valve 530 and enters receier 514 at point 515. Thereafter the refrigerant exits the receiver at point 516 and follows the same path back to the solar collector 502 as in modes H1a and H1b.

In mode H2b, the refrigerant follows the same path as in mode H2a, except that instead of entering transfer valve 507, it passes from transfer valve 535 to transfer valve 522, flow transducer 524, traverses the condensing coil (not shown) of condenser and high-temperature reservoir 525, transfer valve 527 from which it exits at point 537, traverses the coil 538 of subcooler 539, throttling valve 540 and enters receiver 514 at point 529. Thereafter the refrigerant exits the receiver 514 at point 516 and follows the same path as in all the earlier modes.

In modes H3a and H3b, the refrigerant follows the same path as in modes H2a and H2b, respectively. However, whereas in the first three of these six modes the space behind the evaporator is airtight, in the last three modes outdoor air is forced through this space so that the evaporator (not shown) in the solar collector can absorb heat from this air. Air ducts (not shown) are used to channel this air into and out of the solar collector, and dampers (not shown) are used to isolate from or open to the outdoor air the air channel (air chase) 111 shown in FIG. 3b.

In mode C, the refrigerant leaves receiver 514 at exit 541, passes through thermostatic expansion valve 542, condensing coil (not shown) of the condenser and low-temperature heat reservoir 543, transfer valve 531, compressor 533, transfer valve 534, outdoor condenser 544 and returns to receiver 514 at point 545.

In mode C & P, the refrigerant traverses the same path as in mode C, but in addition, the refrigerant also circulates in the Rankine power cycle circuit. Namely, the refrigerant enters solar collector 502 at point 501 and exits at point 503. Next the refrigerant splits at point 550 into two parallel flow paths. One of these paths traverses transfer valve 504, exits at point 551, next traverses heat engine 552, outdoor condenser 544 and enters receiver 514 at point 515. Finally this flow path exits at point 516, traverses valve 517, pump 518, flow transducer 519, transfer valve 521 exiting at point 553, and returns to solar condenser 502 after passing through heat exchanger 554 and exiting at point 555. The second of the two aforementioned parallel flow paths traverses valve 556, heat exchanger 554, receiver 557, pump 558, flow transducer 559, check valve 560 and returns to solar collector 502 entering at point 501. This seconf flow path is only used in the C & P mode, and the refrigerant is prevented from flowing through it in other modes by check valve 560, and by valve 556 which is open only when the C & P mode is being used.

Although not shown in FIG. 9, (a) the heat released by the outdoor condenser can be used to preheat the cold water entering the hot-water supply system, (b) and/or be used to reheat the cool air supplied during mode C & P to obtain additional dehumidification in cases where the latent-to-sensible load ratio is high. It will be obvious to those skilled in the art how either of these two functions can be accomplished by conventional techniques or by using the Rankine-type heat transfer cycle described earlier.

One of the three modes, H1a, H2a or H3a, is selected (automatically by the CCU) whenever the temperature of the water at the bottom of the hot-water reservoir 509 falls below a preselected valve, say 130° F., and whenever the high temperature reservoir does not "require" heat to be supplied to it based upon preselected criteria, such as, the amount of heat then presently stored. Among these modes, Mode H1a is selected whenever the difference between the radiation equilibrium temperature and the temperature at the bottom of the hot-water reservoir 509 exceeds a preselected valve, say, 20° F. Mode H2a is selected whenever this difference falls below this preselected value and the radiation equilibrium temperature exceeds the ambient air temperature. Mode H3a is used when the radiation equilibrium temperature falls below the ambient air temperature and the later temperature is above a preselected temperature, say 40° F.

One of the three modes, H1b, H2b or H3b, is selected whenever the high temperature reservoir "required" heat to be supplied to it based on the aforesaid preselected criteria, such as, the amount of heat then presently stored. Among these modes, Mode H1b is selected whenever the difference between the radiation equilibrium temperature and the temperature of the high temperature reservoir exceeds a preselected value, say 30° F. Mode H2b is selected whenever this difference falls below the preselected value and the radiation equilibrium temperature exceeds the ambient air temperature. Mode H3b is selected whenever the radiation equilibrium temperature falls below that of the ambient air.

One of the two modes, mode C & P or mode C is selected whenever the low temperature reservoir "requires" heat to be removed from it, based on preselected criteria. Mode C & P is selected whenever the difference in temperature between the radiation equilibrium temperature and the ambient air temperature exceeds a preselected number, say, 50° F., for which the heat engine is known to produce useful output. Mode C is selected whenever the foregoing difference is less than the preselected value, say, 50° F.

Many of the novel features of this invention do not depend on the fact that the working fluid is a "refrigerant." The only essential requirement is that the working fluid alternate between the liquid phase and the vapor phase during one complete cycle. In particular, the novel configuration of the evaporator of the solar collector, the novel Rankine-type heat transfer cycle, and the novel technique used in the Rankine-power cycle to apportion the working fluid between a path that transverses the heat engine and a path that by-passes the heat engine, in the manner described herein, can be any fluid whose phase changes during a cycle between the liquid and the vapor phases such as, for example, water.

I wish to again emphasize that the typical embodiments of my invention described herein are provided for illustrative purpose only since many other applications and modifications and control techniques will occur readily to one skilled in the art. Accordingly, it is intended that my present invention not be limited in any way to the specific embodiments described, but rather be limited only as defined in the appended claims.

What I claim is:

1. A heating system comprising radiant heat collector means for absorbing radiant heat and evaporating liquid-vapor working fluid and means for transferring the absorbed heat to a medium to be heated when the saturated vapor temperature of said fluid in said absorbing and evaporating means is below the temperature of said medium; said heat transfer means comprising means for compressing working fluid vapor exiting said absorbing and evaporating means, means for condensing the compressed working fluid vapor and releasing heat to said medium, and throttling means for expanding or metering the condensed working fluid before said fluid is evaporated in said absorbing and evaporating means; and means for selecting and maintaining the saturated vapor temperature of said fluid in said collector means independently of the temperature of said medium and of the heating load imposed by said medium on said heating system.

2. A heating system in accordance with claim 1 wherein the temperature of the saturated vapor of the said fluid in said collector means is controlled so as to maintain the difference between said saturated vapor temperature and the temperature of said medium at a value sufficient to ensure that said condensing means releases heat to said medium at a rate that is equal to the difference between the rate at which the said heating system gains heat from all outside heat sources minus the rate at which said heating system loses heat to all undersirable outside heat sinks.

3. A heating system in accordance with claim 1 and further including means for selecting and maintaining the saturated vapor temperature of said fluid in said absorbing and evaporating means independently of the temperature of the material substance in which said absorbing and evaporating means is in physical contact and of the intensity and frequencies contained in the radiant energy impinging on said absorbing and eavporating means while, at the same time, maintaining said fluid at the exit of said collecting and evaporating means in the vapor state with the desired degree of super heat; said means for selecting and maintaining said saturated vapor temperature and said degree of superheat including means for adjusting the mass flow rate of said fluid in the vapor phase by adjusting said compressing means and means for adjusting independently the mass flow rate of the said fluid in the liquid phase by providing means for storing said liquid downstream of said condensing means, and by providing pumping means and adjusting said pumping means.

4. A heating system in accordance with claim 1 wherein the means for causing said condensing means to release heat to said medium at said desired rate comprises means for storing said liquid downstream of said condensing means, means for throttling said liquid downstream of said condensing means and upstream of said storing means, servo means for adjusting said throttling means whose reference signal is said desired rate of heat release, and means for computing the actual rate at which said condensing means releases heat to said medium which includes means for measuring pressure of said fluid in said condensing means, means for computing mass flow rate of fluid in vapor state, and means for computing degree of superheat of said fluid at entrance of said condensing means.

5. A heating system in accordance with claim 4 and further comprising means for subcooling the fluid downstream from said condensing means and upstream from said throttling means to a desired temperature essentially equal to saturated vapor temperature of fluid in said collecting and evaporating means when said collecting and evaporating means is surrounded by a material substance whose heat capacity is essentially infinite and whose temperature is below that of said saturated vapor temperature of said fluid in said collecting and evaporating means.

6. A heat system in accordance with claim 1 and further comprising means for selectively placing said collecting and evaporating means in heat exchanging relationship with the ambient air.

7. A heating system in accordance with claim 1 in which said means for maintaining the saturated vapor temperature of the fluid in the collector means includes a means for measuring the radiation equilibrium temperature of the absorbing surface of the collecting and evaporating means and means for predicting the rate at which radiant heat can be absorbed by said fluid in said collector and evaporating means at any given saturated temperature of said fluid in said collecting and absorbing means.

8. A heating system in accordance with claim 1 and futher including means for separating working fluid vapor from working fluid liquid exiting said absorbing and evaporating means in advance of said means for compressing the working fluid vapor.

9. A heating system comprising:
 means for absorbing heat and evaporating a liquid-vapor working fluid;

means for transferring the absorbing heat to a medium to be heated when the saturated vapor temperature of said fluid in said absorbing and evaporating means is above the temperature of said medium to be heated which includes means for throttling the working fluid exiting said absorbing and evaporating means, means for condensing the vapor of the working fluid exiting said throttling means to release heat to said medium, and means for pumping the condensed working fluid back to said absorbing and evaporating means;

and means for transferring the absorbed heat to a medium to be heated wen the saturated vapor temperature of said fluid in said absorbing and evaporating means is below the temperature of said medium to be heated, which includes means for compressing the working fluid vapor exiting said absorbing and evaporating means, means for condensing the compressed working fluid vapor and releasing heat to said medium and throttling means for expanding or metering the condensed working fluid before said fluid is evaporated in said absorbing and evaporating means.

10. A heating system comprising:

means for collecting solar heat and evaporating a liquid-vapor working fluid therewith;

means for transferring the heat absorbed by the working fluid to a medium to be heated when the saturated vapor temperature of said fluid in said absorbing and evaporating means is above the temperature of said medium to be heated which includes means for throttling the working fluid exiting said absorbing and evaporating means, means for condensing the vapor of the working fluid exiting said throttling means to release heat to said medium, and means for pumping the condensed working fluid back to said absorbing and evaporating means;

and means for transferring the heat absorbed by said working fluid to a medium to be heated when the saturated vapor temperature of said fluid in said absorbing and evaporating means is below the temperature of said medium to be heated, which includes means for compressing the working fluid vapor exiting said absorbing and evaporating means, means for condensing the compressed working fluid vapor and releasing heat to said medium and throttling means for expanding or metering the condensed working fluid before said fluid is evaporated in said absorbing and evaporating means.

11. A heating system comprising: means for absorbing radiant heat by evaporating a liquid-vapor working fluid and means for transferring the absorbed heat to a medium to be heated when the saturated-vapor temperature of said fluid and said absorbing and evaporating means is above the temperature of said medium; said heat transfer means comprising means for throttling the working fluid exiting said absorbing and evaporating means, means for condensing the vapor of the working fluid exiting said throttling means to release heat to said medium, means for pumping the condensed working fluid back to said absorbing and evaporating means, means for initially adjusting said throttling means and said pumping means to control the saturated vapor temperature of said fluid in said absorbing and evaporating means until it is equal to an initial preselected temperature; means for setting said throttling means to fully open position when said saturated vapor temperature becomes equal to said initial preselected temperature; and means for adjusting pumping means after said throttling means is set to said fully open position to ensure said fluid exits said absorbing and evaporating means essentially in the dry vapor state at a temperature above the temperature of said medium, but not necessarily equal to said initial preselcted temperature.

12. A heating system in accordance with claim 11 wherein the means for selecting said initial preselected temperature and adjusting said pumping means comprises means for measuring the radiation equilibrium temperature of the heat absorbing surface of said collecting and evaporating means and means for predicting the rate at which radiant heat can be absorbed by and said fluid evaporated in said collector and evaporating means at any given saturated vapor temperature of said fluid in said collecting and absorbing means, and means for maintaining the saturated vapor temperature in the absorbing and evaporating means at a value that exceeds the temperature of the medium to be heated by only the minimum amount appropriate to transfer heat to said medium at the rate at which it is absorbed by said collecting and evaporating means.

13. A heating system in accordance with claim 11 wherein (1) said initial adjustment of said throttling means consists in selecting a fixed setting of said throttling means to a partially open position where said fixed setting selection is a function of said radiation equilibrium temperature (2) said initial adjustments of said pumping means comprises servo means for controlling the mass flow rate of said fluid as a function of the differences between said radiation equilibrium temperature and said initial preselected temperature, (3) said initial preselected temperature is below said radiation equilibrium temperature, (4) said means for setting said throttling means to fully open position comprises signals generated when said saturated vapor temperature becomes equal to said initial preselected temperature, and (5) wherein said means for adjusting said pumping means after said throttling means is set to said fully open position comprises servo means for controlling mass flow rate of said fluid as a function of the difference between said radiation equilibrium temperature and the saturated vapor temperature of said fluid at the exit of said collecting and evaporating means.

14. A heating system which comprises means for absorbing radiant heat and for evaporating a liquid-vapor working fluid and means for transferring the absorbed heat to a portion of a medium to be heated when the saturated-vapor temperature of said fluid in said absorbing and evaporating means is above the temperature of the portion of said medium to be heated; said heat transfer means including means for condensing the vapor portion of the working fluid exiting said absorbing and evaporating means and for releasing heat to said medium, means for pumping the condensed working fluid back to said absorbing and evaporating means, means for starting said pumping means whenever the net rate at which heat can be absorbed by said absorbing and evaporating means and transferred to said medium is greater than a preselected amount, and means for stopping said pumping means whenever the net rate at which heat is being absorbed by said absorbing and evaporating means is smaller than a preselected amount.

15. A heating system in accordance with claim 14 and further including means for storing said condensed working fluid between said condensing means and said pumping means, and means for stopping said pumping means when the liquid level of working fluid in said storage means falls below a preselected level.

16. A heating system in accordance with claim 14 and further including throttling means between said absorbing and evaporating means and said condensing means and means for adjusting said throttling means initially to a partially closed position to set the saturated vapor temperature of said fluid in said absorbing and evaporating means at a selected initial value above the temperature of the part of the medium to be heated, said throttling means being set thereafter at the fully open position.

17. A heating system in accordance with claim 14 and further including means for adjusting said pumping means initially to superheat the working fluid exiting said absorbing and evaporating means and thereafter to maintain said superheat at a small preselected value, and means for measuring said superheat.

18. A heating system in accordance with claim 14 and further including means for adjusting said pumping means as a function of the net rate at which heat is being absorbed by said absorbing and evaporating means thereby maintaining the saturated vapor temperature in said absorbing and evaporating means at a value that exceeds the temperature of the portion of the medium to be heated by only the minimum amount appropriate to transfer heat to said portion at the rate at which it is absorbed by said absorbing and evaporating means.

19. A heating system in accordance with claim 14 and further including means for measuring the radiation equilibrium temperature of the absorbing surface of said absorbing and evaporating means and wherein the measure employed for the said net rate is a function of the difference between the said radiation equilibrium temperature and the saturated vapor temperature of the working fluid in said absorbing and evaporating means.

20. A heating system in accordance with claim 14 and further including means for measuring the radiation equilibrium temperature of the absorbing surface of said absorbing and evaporating means and wherein the measure employed for the said net rate is a function of both (a) the difference between the said radiation equilibrium temperature and the temperature of the fluid, external to said absorbing and evaporating means through which the radiation absorbed by said absorbing and evaporating means propagates and (b) the difference between the saturated vapor temperature of the working fluid in said absorbing and evaporating means and the temperature of the said external fluid.

21. A heating system in accordance with claim 14 wherein the saturated vapor temperature of the working fluid in said absorbing and evaporating means is determined by obtaining a measure of the pressure of the working fluid in the absorbing and evaporating means and deriving from said pressure an estimate of the saturated vapor temperature.

22. A heating system in accordance with claim 14 and further comprising means for selectively placing said collecting and evaporating means in heat exchanging relationship with the ambient air.

23. A heating system in accordance with claim 14 and further including means for separating the vapor portion from the liquid portion of the working fluid exiting said absorbing and evaporating means in advance of said means for condensing the vapor portion of the working fluid.

24. A heating system which comprises: means for absorbing radiant heat and for evaporating a liquid-vapor working fluid and means for transferring the absorbed heat to a medium to be heated when the saturated vapor temperature of said fluid in said absorbing and evaporating means is above the temperature of the part of said medium to be heated; said heat transfer means including means for transferring the evaporated portion of the working fluid exiting said absorbing and evaporating means to a condensing means for condensing the vapor and for releasing heat to the part of said medium to be heated, means for storing said condensed working fluid, means for pumping the condensed working fluid exiting said storage means back to said absorbing and evaporating means, means for measuring the liquid level of the working fluid in said storage means, and means for controlling said pumping means as a function of the said liquid level in such a manner that the flow rate of the condensed working fluid is zero when said liquid level falls below a minimum preselected level and is greatest when said liquid level rises above a maximum preselected level.

25. A heating system in accordance with claim 24 wherein said heat transfer means further includes throttling means in advance of said condensing means and means for adjusting said throttling means initially to a partially closed position to set the saturated vapor temperature of said fluid in said absorbing and evaporating means at a selected initial value above the temperature of the part of the medium to be heated, said throttling means being set thereafter at the fully open position.

26. A heating system in accordance with claim 24 wherein said absorbing and evaporating means includes means for separating the evaporated portion of the working fluid from the non-evaporated portion of the working fluid.

27. A heating system which comprises: means for absorbing radiant heat and for evaporating a liquid-vapor working fluid and means for transferring the absorbed heat to a medium to be heated when the saturated vapor temperature of said fluid in said absorbing and evaporating means is above the temperature of the part of said medium to be heated; said heat transfer means comprising means for transferring the evaporated portion of the working fluid exiting said absorbing and evaporating means to means for condensing the vapor and for releasing heat to said medium, means for pumping the condensed working fluid back to said absorbing and evaporating means, and means for adjusting said pumping means as a function of the net rate at which heat is absorbed by said absorbing and evaporating means.

28. A heating system in accordance with claim 27 wherein the medium to be heated is a fluid in contact with said condensing means and further including means for varying the flow rate of said medium through said condensing means to control the temperature of said medium at the exit of said condensing means.

29. A heating system in accordance with claim 27 and further including means for storing condensed working fluid between said condensing means and said pumping means, and means for superimposing upon said adjusting means a fine adjustment of said pumping means as a function of the liquid level of the working fluid in said storage means.

30. A heating system in accordance with claim 27 and further including means for separating the evaporated portion of the working fluid from the non-evaporated portion of the working fluid in advance of the means for condensing the vapor.

31. A heating system for absorbing and transferring radiant heat to a medium to be heated by using a liquid-vapor working fluid which comprises:
   (a) substantially planar collector means for absorbing radiant heat and evaporating at least a portion of said working fluid at a saturated temperature which is above the temperature of said medium at a point of heating, said means being sloped with regard to the horizontal and having an exit for the working fluid near the top;
   (b) means for separating the evaporated portion of the working fluid from the non-evaporated portion of the working fluid exiting said absorbing and evaporating means, said separating means being positioned vertically with respect to said absorbing and evaporating means such that the level of any non-evaporated portion of the fluid in said separating means is above the exit of said absorbing and evaporating means;
   (c) means for transferring the evaporated portion of the working fluid exiting said separating means to a condensing means for releasing heat to said medium at the point of heating, said heating means condensing substantially all of the evaporated portion of the working fluid leaving the separator means; and
   (d) means for returning the condensed working fluid back to said absorbing and evaporating means wherein the medium to be heated is a fluid, and further including means for circulating said fluid medium through said condensing means to absorb heat released by said working fluid during condensation, means for starting said circulating means whenever the net rate at which heat can be absorbed by said absorbing and evaporating means and transferred to said medium is greater than a preselected amount, and means for stopping said circulating means whenever the net rate at which heat is being absorbed by said absorbing and evaporating means is smaller than a preselected amount.

32. A heating system in accordance with claim 31 wherein the medium to be heated is a fluid, and further including means for detecting flow of the evaporated portion of said working fluid between said separating means and said absorbing and evaporating means, means for circulating said fluid medium, means for said fluid medium to absorb heat released by said working fluid during condensation, means for starting said circulating means whenever the saturated vapor temperature of the working fluid in said absorbing and evaporating means is greater than the temperature of the part of the medium to be heated by a preselected amount, and means for stopping said circulating means whenever the flow rate of the evaporated portion of said working fluid from said separating means to said absorbing and evaporating means is smaller than a preselected amount.

33. A heating system which comprises: means for absorbing radiant heat and evaporating a liquid-vapor working fluid and means for transferring the absorbed heat to a portion of the medium to be heated when the saturated vapor temperature of said working fluid in said absorbing and evaporating means is above and below the temperature of the portion of said medium to be heated; said heat transfer means comprising means for condensing the vapor of said working fluid generated by said absorbing and evaporating means, means for transferring the heat released by condensation to the medium to be heated, means for returning condensed working fluid to said absorbing and evaporating means, first control means for regulating the circulation of said working fluid when the saturated vapor temperature of said working fluid in said absorbing and evaporating means is above the temperature of the portion of said medium to be heated, and second control means for regulating the circulation of said working fluid when the saturated vapor temperature of said working fluid in said absorbing and evaporating means is below the temperature of the portion of said medium to be heated.

34. A heating system in accordance with claim 33 wherein said second circulation control means includes means for compressing the vapor of the working fluid generated by said absorbing and evaporating means and means for throttling the condensate of the working fluid generated in said condensing means.

35. A heating system in accordance with claim 33 wherein the said first circulation control means and the said second circulation control means are employed to regulate the circulation of said working fluid as a function of the net rate at which heat is being absorbed by said absorbing and evaporating means.

36. A heating system in accordance with claim 33 and further including means for deciding whether heat is to be transferred from said absorbing and evaporating means to said condensing means by employing said first circulation control means or by said second circulation control means, and means for deciding and selecting when heat is transferred by employing said second circulation control means the saturated vapor temperature at which heat is to be absorbed by said workihg fluid in said absorbing and evaporating means.

37. A heating system in accordance with claim 33, and further including means for deciding whether heat is to be transferred from said absorbing and evaporating means by employing said first circulation control means or by said second circulation control means and means for starting said selected circulation control means whenever the said net rate is greater than a selected amount and for stopping said selected circulation means whenever the said net rate is smaller than a selected amount.

38. A heating system in accordance with claim 35 wherein the means for measuring the said net rate comprises means for measuring the radiation equilibrium temperature of the absorbing surface of said absorbing and evaporating means and wherein the measure employed for the said net rate is a function of the difference between the said radiation equilibrium temperature and the saturated vapor temperature of the working fluid in said absorbing and evaporating means.

39. A heating system in accordance with claim 35 wherein the means for measuring the said net rate comprises means for measuring the radiation equilibrium temperature of the absorbing surface of said absorbing and evaporating means and wherein the measure employed for the said net rate is a function of both (a) the difference between the said radiation equilibrium temperature and the temperature of the fluid, external to said absorbing and evaporating means through which the radiation absorbed by said absorbing and evaporating means propagates and (b) the difference between the saturated vapor temperature of the working fluid in said absorbing and evaporating means and the temperature of the said external fluid.

40. A heating system according to claim 33 wherein the function representing the said net rate is of the form $k_e'(t_{eq}-t_a)-k_e''(t_{es}-t_a)-k_e'''u_{ex}$ wherein $k_e'$ and $k_e''$ are smooth, weak functions of the differences $(t_{eq}-t_a)$ and $(t_{es}-t_a)$, respectively, $k_e'''$ is a constant, $t_{eq}$ is the said radiation equilibrium temperature, $t_a$ is the temperature of the said external fluid, $t_{es}$ is the said saturated vapor temperature of the working fluid in said absorbing and evaporating means, and $\mu_{ex}$ is the velocity of the said external fluid over the surface of the said absorbing and evaporating means, and wherein the quantities $k_e'$, $k_e''$ and $k_e'''$ are obtainable by calibration tests.

41. A heating system in accordance with claim 33 wherein the first circulation control means and the second circulation control means are employed to regulate the circulation of said working fluid as a function of the said net rate and a function of a measure of the pressure of the working fluid in said absorbing and evaporating means.

42. A heating system in accordance with claim 33 and further including separating means between said absorbing and evaporating means and said compressing means, means for returning working fluid exiting in liquid phase from said separating means back to said absorbing and evaporating means, and means for conducting working fluid exiting in vapor phase from said separating means to said compressing means.

43. A heating system in accordance with claim 33 and further including subcooling means between said condensing means and said throttling means and means for adjusting said subcooling means to obtain optimal subcooling whenever a heat sink is available at a temperature below the saturated vapor temperature of the working fluid in said absorbing and evaporating means.

44. A heating system in accordance with claim 33 and further including means for superimposing on said compressing means an adjustment means for fine adjustment of said compressing means to maintain the superheat of the working fluid exiting said absorbing and evaporating means at a small preselected value.

45. A heating system which comprises:
means for absorbing radiant heat and evaporating a first liquid-vapor working fluid;
first means for transferring the absorbed heat to a portion of a first medium to be heated including means for condensing the vapor of said first fluid generated in said absorbing and evaporating means and for releasing heat to said first medium, means for returning condensed first working fluid to said evaporating means, and means for controlling the circulation of said first fluid;
and second means for transferring heat from said first medium to a second medium to be heated, including means for absorbing heat from said first medium and for evaporating a second liquid-vapor working fluid with the absorbed heat from said first medium, means for condensing the vapor of said second working fluid and for releasing heat to said second medium, means for returning the condensed second working fluid to said absorbing and evaporating means, and means for controlling the circulation of second fluid, wherein at least one of the means for transferring heat is a Rankine-type heat transfer cycle which includes means for absorbing heat and evaporating the working fluid, means for condensing the vapor portion of the working fluid while transferring heat to a medium to be heated, and means for transferring the vapor portion of the working fluid from the absorbing and evaporating means to the condensing means and means for transferring the condensed working fluid from the condensing means to the absorbing and evaporating means.

46. A heating system which comprises:
means for absorbing radiant heat and evaporating a first liquid-vapor working fluid;
first means for transferring the absorbed heat to a portion of a first medium to be heated including means for condensing the vapor of said first fluid generated in said absorbing and evaporating means and for releasing heat to said first medium, means for returning condensed first working fluid to said evaporating means, and means for controlling the circulation of said first fluid;
and second means for transferring heat from said first medium to a second medium to be heated, including means for absorbing heat from said first medium and for evaporating a second liquid-vapor working fluid with the absorbed heat from said first medium, means for condensing the vapor of said second working fluid and for releasing heat to said second medium, means for returning the condensed second working fluid to said absorbing and evaporating means, and means for controlling the circulation of second fluid, wherein said second heat transfer means is a Rankine-type heat transfer cycle which comprises a Rankine power cycle with engine omitted and a vapor-compression heating cycle operating simultaneously.

47. A heating system for absorbing and transferring radiant heat to a medium to be heated by using a refrigerant working fluid which comprises:
(a) means for absorbing radiant heat and evaporating a portion of said working fluid at a saturated temperature which is above the temperature of said medium at a point of heating;
(b) means for separating the evaporated portion of the working fluid from the non-evaporating portion of the working fluid;
(c) means for transferring the evaporated portion of the working fluid to a condensing means for releasing heat to said medium at the point of heating, said condensing means condensing substantially all of the evaporated portion of the working fluid leaving the separator means; and
(d) means for controlling the flow of the condensed working fluid back to said absorbing and evaporating means so as to avoid any significant superheat of said evaporating portion of the working fluid existing said absorbing and evaporating means.

48. A heating system in accordance with claim 47 and further including means for storing said condensed working fluid between said condensing means and said pumping means, and means for stopping said pumping means when the liquid level of working fluid in said storage means falls below a preselected level.

49. A heating system in accordance with claim 47 wherein said radiant heat is solar heat and said absorbing and evaporating means is a solar collector.

50. A heating system in accordance with claim 47 and further including means for starting said pumping means whenever the net rate at which heat can be absorbed by said absorbing and evaporating means and transferred to said medium is greater than a preselected amount, and means for stopping said pumping means whenever the net rate at which heat is being absorbed by said absorbing and evaporating means is smaller than a preselected amount.

* * * * *